(12) United States Patent
Siminoff

(10) Patent No.: US 10,863,146 B1
(45) Date of Patent: Dec. 8, 2020

(54) SETUP AND CONFIGURATION OF AUDIO/VIDEO RECORDING AND COMMUNICATION DEVICES

(71) Applicant: Amazon Technologies, Inc., Seattle, WA (US)

(72) Inventor: James Siminoff, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 65 days.

(21) Appl. No.: 16/129,483

(22) Filed: Sep. 12, 2018

Related U.S. Application Data

(60) Provisional application No. 62/557,532, filed on Sep. 12, 2017.

(51) Int. Cl.
  *H04N 7/18* (2006.01)
  *H04N 5/225* (2006.01)
  *H04N 5/232* (2006.01)

(52) U.S. Cl.
  CPC .......... *H04N 7/186* (2013.01); *H04N 5/2256* (2013.01); *H04N 5/23206* (2013.01)

(58) Field of Classification Search
  CPC ............... H04W 12/06; G02B 27/0176; H04L 12/2825; H04N 7/183; H04N 7/186
  See application file for complete search history.

(56) References Cited

U.S. PATENT DOCUMENTS

| | | | |
|---|---|---|---|
| 4,764,953 | A | 8/1988 | Chern et al. |
| 5,428,388 | A | 6/1995 | von Bauer et al. |
| 5,760,848 | A | 6/1998 | Cho |
| 6,072,402 | A | 6/2000 | Kniffin et al. |
| 6,192,257 | B1 | 2/2001 | Ray |
| 6,271,752 | B1 | 8/2001 | Vaios |
| 6,429,893 | B1 | 8/2002 | Xin |
| 6,456,322 | B1 | 9/2002 | Marinacci |
| 6,476,858 | B1 | 11/2002 | Ramirez Diaz et al. |

(Continued)

FOREIGN PATENT DOCUMENTS

| | | |
|---|---|---|
| CN | 2585521 Y | 11/2003 |
| CN | 2792061 Y | 6/2006 |

(Continued)

*Primary Examiner* — Peet Dhillon
(74) *Attorney, Agent, or Firm* — Greenberg Traurig, LLP

(57) ABSTRACT

Audio/video (A/V) recording and communication devices having a light source in accordance with various embodiments of the present disclosure are provided. In one embodiment, an A/V recording and communication device is provided, the A/V recording and communication device comprising: a processor, a camera, a communication module, a light source, and a non-transitory machine-readable memory storing a program executable by the processor, the program comprising sets of instructions for: receiving, using the communication module, from a client device associated with the A/V recording and communication device, an activation request to activate the light source; in response to receiving the activation request, activating the light source and recording, by the camera, image data in a field of view; receiving, using the communication module, from the client device, a deactivation request to deactivate the light source; and in response to receiving the deactivation request, deactivating the light source and the camera.

19 Claims, 15 Drawing Sheets

(56) References Cited

U.S. PATENT DOCUMENTS

| | | |
|---|---|---|
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,872,915 B1 | 5/2014 | Scalisi et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Scalisi |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi |
| 9,179,108 B1 | 11/2015 | Scalisi |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2002/0094111 A1 | 7/2002 | Puchek et al. |
| 2002/0147982 A1 | 10/2002 | Naidoo et al. |
| 2003/0043047 A1 | 3/2003 | Braun |
| 2003/0210340 A1* | 11/2003 | Frederick Romanowich ............ G08B 13/1966 348/272 |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2010/0225455 A1 | 9/2010 | Claiborne et al. |
| 2012/0130513 A1* | 5/2012 | Hao ............ G05B 15/02 700/90 |
| 2013/0057695 A1 | 3/2013 | Huisking |
| 2014/0267716 A1* | 9/2014 | Child ............ H04N 7/186 348/143 |
| 2015/0163463 A1 | 6/2015 | Hwang et al. |
| 2016/0027262 A1* | 1/2016 | Skotty ............ H05B 47/19 340/541 |
| 2018/0047267 A1* | 2/2018 | Modestine ......... H04N 5/23293 |

FOREIGN PATENT DOCUMENTS

| | | |
|---|---|---|
| EP | 0944883 A1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

* cited by examiner

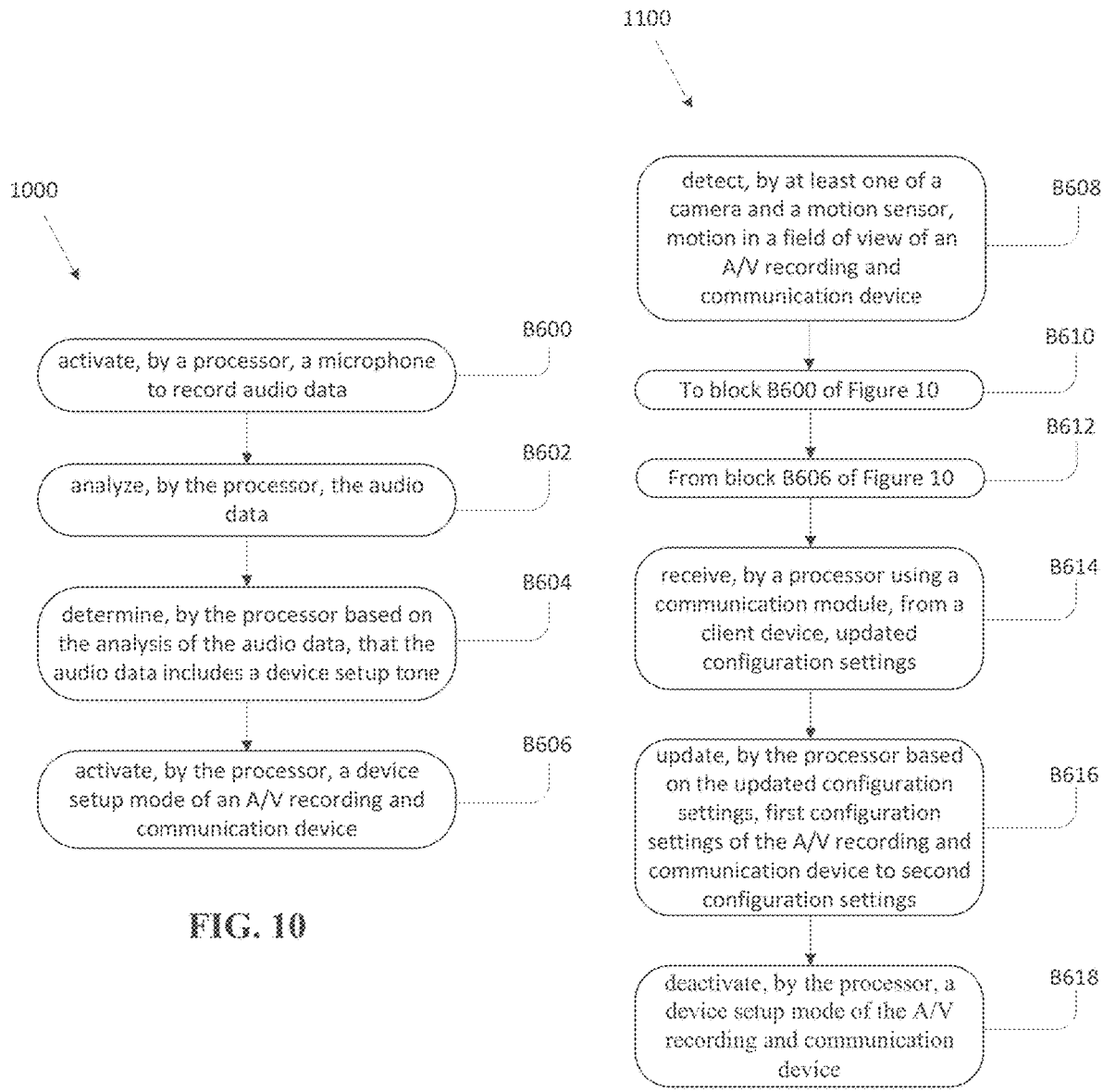

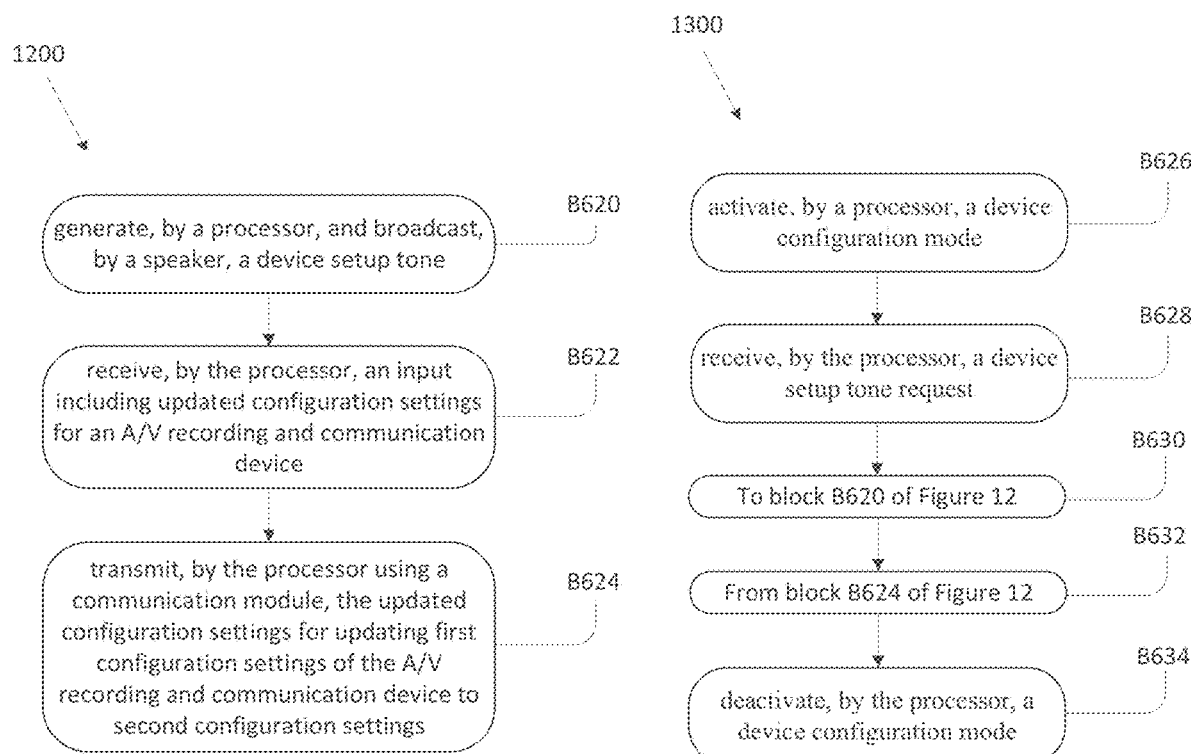

SETUP AND CONFIGURATION OF AUDIO/VIDEO RECORDING AND COMMUNICATION DEVICES

CROSS-REFERENCE TO RELATED APPLICATION

This application claims priority to provisional application Ser. No. 62/557,532, filed on Sep. 12, 2017, the entire contents of which are hereby incorporated by reference.

TECHNICAL FIELD

The present embodiments relate to audio/video (A/V) recording and communication devices, including A/V recording and communication doorbell systems. In particular, the present embodiments relate to improvements in the functionality of A/V recording and communication devices that strengthen the ability of such devices to reduce crime and enhance public safety.

BACKGROUND

Home safety is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication doorbell can be uploaded to the cloud and recorded on a remote server. Subsequent review of the A/V footage can aid law enforcement in capturing perpetrators of home burglaries and other crimes. Further, the presence of one or more an A/V recording and communication devices on the exterior of a home, such as a doorbell unit at the entrance of a home, acts as a powerful deterrent against would-be burglars.

SUMMARY

The various embodiments of the present setup and configuration of audio/video (A/V) recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that A/V recording and communication devices may require updates to the configuration settings (e.g., network connectivity settings, motion settings, etc.) from time to time. In order to update the configuration settings, the A/V recording and communication device may require that the user of the device manually put the A/V recording and communication device into a device setup mode (e.g., by pressing a setup button on the device). However, A/V recording and communication devices may be mounted out of reach of the user (e.g., above a garage door, along the roof line of the property, etc.) and/or may be difficult to detach from their installation point (e.g., require removing multiple screws, detaching wires, etc.).

The present embodiments solve this problem by leveraging the functionality of A/V recording and communication devices to activate a device setup mode in response to a device setup tone. For example, a user may transmit the device setup tone from their client device using an application associated with the A/V recording and communication device. In response to playing the device setup tone, the A/V recording and communication device may receive the tone using a microphone and activate the device setup mode. As a result, the A/V recording and communication device is capable of being reconfigured (e.g., receiving updated configuration settings) without the user having to manually interact with the device. Ultimately, the user may be more likely to reconfigure the A/V recording and communication device when the device needs to be reconfigured (e.g., when the network credentials for the user's network that the A/V recording and communication device is connected to have changed). By reconfiguring the device sooner, the A/V recording and communication device is able to provide the intended safety and security to the property at an earlier time, thereby contributing to the safety of the property, the neighborhood, and the public safety as a whole.

Another aspect of the present embodiments includes the realization that for A/V recording and communication devices including a light source (e.g., a floodlight, a spotlight, etc.), other the present embodiments, when the light source is manually turned on at the request of a user of the A/V recording and communication device, the camera does not always record video footage. For example, the user may have to manually turn on the light source (e.g., using their client device) and also separately turn on the camera to record video (e.g., by activating a live view setting using their client device). However, the user, in some situations, may activate the light source in response to a suspicion of suspicious activity in the field of view of the A/V recording and communication device. In situations where there is in fact suspicious activity taking place, because the camera may not start recording in response to the light source being turned on, the user may not capture the suspicious activity and thus may not be able to reference the video footage for determining the cause of the suspicious activity (e.g., the identity of the person or the activity taking place).

The present embodiments solve this problem by leveraging the functionality of A/V recording and communication devices to activate the camera to record video in response to the light source being turned on. For example, the A/V recording and communication device may record the video and save the video locally, and/or may transmit the video to a backend device for storage. As a result, the user may be able to view the video footage to determine the cause of the suspicious activity.

In a first aspect, an audio/video (A/V) recording and communication device including a processor and a microphone, activates, by the processor, the microphone to record audio data; analyzes, by the processor, the audio data; determines, by the processor based on the analysis of the audio data, that the audio data includes a device setup tone; and in response to the determination that the audio data includes the device setup tone, activates, by the processor, a device setup mode of the A/V recording and communication device.

In an embodiment of the first aspect, the microphone is activated in response to the A/V recording and communication device detecting motion in a field of view of the A/V recording and communication device.

In another embodiment of the first aspect, the motion is detected by at least one of a camera and a motion sensor of the A/V recording and communication device.

In another embodiment of the first aspect, the device setup tone is broadcast by a client device associated with the A/V recording and communication doorbell.

In another embodiment of the first aspect, analyzing the audio data includes: in response to recording the audio data, generating, by the processor, an audio data audio fingerprint of the audio data; and comparing, by the processor, the audio data audio fingerprint to a device setup tone audio fingerprint stored on the A/V recording and communication device.

In another embodiment of the first aspect, the device setup tone audio fingerprint includes the same digital file format as the audio data audio fingerprint.

In another embodiment of the first aspect, when in the device setup mode, the camera and the microphone are powered down.

In another embodiment of the first aspect, upon entering the device setup mode, the A/V recording and communication device generates and broadcasts, by the processor using the communication module, a Wi-Fi direct network; connects, by the processor using the communication module, to a client device using the Wi-Fi direct network; and in response to connecting to the client device, receives, by the processor using the communication module, updated configuration settings from the client device.

In another embodiment of the first aspect, the A/V recording and communication device includes one of an A/V recording and communication floodlight, an A/V recording and communication spotlight, an A/V recording and communication camera, and an A/V recording and communication doorbell.

In another embodiment of the first aspect, the A/V recording and communication device receives, by the processor using the communication module, updated configuration settings; and updates, by the processor, current configuration settings of the A/V recording and communication device based on the updated configuration settings.

In another embodiment of the first aspect, the updated configuration settings are received in response to an input to a client device associated with the A/V recording and communication device, the input including at least one desired update to the current configuration settings of the A/V recording and communication device.

In another embodiment of the first aspect, in response to recording the audio data, the audio data is stored, by the processor, in a digital audio format.

In a second aspect, an audio/video (A/V) recording and communication device including a processor, a microphone, a communication module, and a camera and having first configuration settings, detects, by at least one of the camera and a motion sensor, motion in a field of view of the A/V recording and communication device; in response to detecting the motion, activates, by the processor, the microphone to record audio data; receives, by the microphone, from a client device associated with the A/V recording and communication device, audio data comprising a device setup tone; determines, by the processor based on an analysis of the audio data, that the audio data includes the device setup tone; in response to the determination that the audio data includes the device setup tone, activates, by the processor, a device setup mode of the A/V recording and communication device; receives, by the processor using the communication module, from the client device, updated configuration settings; updates, by the processor based on the updated configuration settings, the first configuration settings to second configuration settings; and deactivates, by the processor, the device setup mode.

In an embodiment of the second aspect, determining that the audio data includes the device setup tone includes: generating, by the processor, an audio data audio fingerprint of the audio data; and comparing, by the processor, the audio data audio fingerprint to a device setup tone audio fingerprint stored on the A/V recording and communication device.

In another embodiment of the second aspect, the device setup tone audio fingerprint includes the same digital file format as the audio data audio fingerprint.

In another embodiment of the second aspect, when in the device setup mode, the camera and the microphone are powered down.

In another embodiment of the second aspect, activating the device setup mode includes: generating and broadcasting, by the processor using the communication module, a Wi-Fi direct network; and connecting, by the processor using the communication module, to the client device using the Wi-Fi direct network.

In another embodiment of the second aspect, the A/V recording and communication device includes one of an A/V recording and communication floodlight, an A/V recording and communication spotlight, an A/V recording and communication camera, and an A/V recording and communication doorbell.

In another embodiment of the second aspect, the updated configuration settings are received in response to an input to the client device, the input including at least one desired update to the first configuration settings of the A/V recording and communication device.

In another embodiment of the second aspect, in response to recording the audio data, the audio data is stored, by the processor, in a digital audio format.

In another embodiment of the second aspect, the A/V recording and communication device analyzes, by the processor, image data captured by the camera to determine whether the image data includes a person; in response to determining that the image data includes a person, transmits, by the processor using the communication module, the image data to a backend device; and receives, by the processor using the communication module, from the backend device, an indication that the person is an authorized person, wherein the device setup mode is activated only in response to the indication that the person is an authorized person.

In a third aspect, an audio/video (A/V) recording and communication device has first configuration settings and comprises: one or more processors; a microphone; a communication module; a camera; and a non-transitory machine-readable memory storing a program, the program executable by at least one of the processors, the program comprising sets of instructions for: detecting, by at least one of the camera and a motion sensor, motion in a field of view of the A/V recording and communication device; in response to detecting the motion, activating the microphone to record audio data; receiving, by the microphone, from a client device associated with the A/V recording and communication device, audio data comprising a device setup tone; determining, based on an analysis of the audio data, that the audio data includes the device setup tone; in response to the determination that the audio data includes the device setup tone, activating a device setup mode of the A/V recording and communication device; receiving, using the communication module, from the client device, updated configuration settings; updating, based on the updated configuration settings, the first configuration settings to second configuration settings; and deactivating the device setup mode.

In an embodiment of the third aspect, determining that the audio data includes the device setup tone includes: generating an audio data audio fingerprint of the audio data; and comparing the audio data audio fingerprint to a device setup tone audio fingerprint stored on the A/V recording and communication device.

In another embodiment of the third aspect, the device setup tone audio fingerprint includes the same digital file format as the audio data audio fingerprint.

In another embodiment of the third aspect, when in the device setup mode, the camera and the microphone are powered down.

In another embodiment of the third aspect, activating the device setup mode includes: generating and broadcasting, using the communication module, a Wi-Fi direct network; and connecting, using the communication module, to the client device using the Wi-Fi direct network.

In another embodiment of the third aspect, the A/V recording and communication device is one of an A/V recording and communication floodlight, an A/V recording and communication spotlight, an A/V recording and communication camera, and an A/V recording and communication doorbell.

In another embodiment of the third aspect, the updated configuration settings are received in response to an input to the client device, the input including at least one desired update to the first configuration settings.

In another embodiment of the third aspect, in response to recording the audio data, the audio data is stored in a digital audio format.

In another embodiment of the third aspect, the program further comprises sets of instructions for: analyzing, by the processor, image data captured by the camera to determine whether the image data includes a person; in response to determining that the image data includes a person, transmitting, by the processor using the communication module, the image data to a backend device; and receiving, by the processor using the communication module, from the backend device, an indication that the person is an authorized person, wherein the device setup mode is activated only in response to the indication that the person is an authorized person.

In a fourth aspect, a client device including a processor, a communication module, and a speaker and associated with an audio/video (A/V) recording and communication device having first configuration settings, generates, by the processor, and broadcasting, by the speaker, a device setup tone; receives, by the processor, an input including updated configuration settings for the A/V recording and communication device; and in response to the A/V recording and communication device entering a device setup mode, transmits, by the processor using the communication module, the updated configuration settings for updating the first configuration settings of the A/V recording and communication device to second configuration settings.

In an embodiment of the fourth aspect, the device setup tone is generated and broadcast in response to receiving a second input to the client device.

In another embodiment of the fourth aspect, the client device, after generating the device setup tone, receives, by the processor using the communication module, an indication that the A/V recording and communication device is in the device setup mode.

In another embodiment of the fourth aspect, the updated configuration settings include at least one of updated network connectivity settings, motion detection settings, and image data quality settings.

In another embodiment of the fourth aspect, the updated configuration settings are transmitted over a Wi-Fi direct network generated by the A/V recording and communication device.

In another embodiment of the fourth aspect, the updated configuration settings are transmitted over a local area network (LAN) installed at a property that the A/V recording and communication device is located.

In another embodiment of the fourth aspect, the updated configuration settings are transmitted to the A/V recording and communication device via a backend device.

In another embodiment of the fourth aspect, the backend device is one of a backend server, an application programming interface (API), and a storage device.

In a fifth aspect, a client device including a processor, a communication module, and a speaker and associated with an audio/video (A/V) recording and communication device having first configuration settings, activates, by the processor, a device configuration mode; receives, by the processor, a device setup tone request; in response to receiving the device setup tone request, generates, by the processor, and broadcasting, by the speaker, a device setup tone; receives, by the processor, an input including updated configuration settings for the A/V recording and communication device; in response to the A/V recording and communication device entering a device setup mode, transmits, by the processor using the communication module, the updated configuration settings for updating the first configuration settings of the A/V recording and communication device to second configuration settings; and deactivates, by the processor, the device configuration mode.

In an embodiment of the fifth aspect, the device setup tone request includes an input to the client device.

In another embodiment of the fifth aspect, the client device, after generating the device setup tone, receives, by the processor using the communication module, an indication that the A/V recording and communication device is in the device setup mode.

In another embodiment of the fifth aspect, the updated configuration settings include at least one of updated network connectivity settings, motion detection settings, and image data quality settings.

In another embodiment of the fifth aspect, the updated configuration settings are transmitted over a Wi-Fi direct network generated by the A/V recording and communication device.

In another embodiment of the fifth aspect, the updated configuration settings are transmitted over a local area network (LAN) installed at a property that the A/V recording and communication device is located.

In another embodiment of the fifth aspect, the updated configuration settings are transmitted to the A/V recording and communication device via a backend device.

In another embodiment of the fifth aspect, the backend device is one of a backend server, an application programming interface (API), and a storage device.

In a sixth aspect, a client device is associated with an audio/video (A/V) recording and communication device having first configuration settings, the client device comprises: one or more processors; a communication module; a speaker; and a non-transitory machine-readable memory storing a program, the program executable by at least one of the processors, the program comprising sets of instructions for: activating a device configuration mode; receiving a device setup tone request; in response to receiving the device setup tone request, generating and broadcasting, by the speaker, a device setup tone; receiving an input including updated configuration settings for the A/V recording and communication device; in response to the A/V recording and communication device entering a device setup mode, transmitting, using the communication module, the updated configuration settings for updating the first configuration settings of the A/V recording and communication device to second configuration settings; and deactivating the device configuration mode.

In an embodiment of the sixth aspect, the device setup tone request includes an input to the client device.

In another embodiment of the sixth aspect, the program further comprises sets of instructions for: after generating the device setup tone, receiving, using the communication module, an indication that the A/V recording and communication device is in the device setup mode.

In another embodiment of the sixth aspect, the updated configuration settings include at least one of updated network connectivity settings, motion detection settings, and image data quality settings.

In another embodiment of the sixth aspect, the updated configuration settings are transmitted over a Wi-Fi direct network generated by the A/V recording and communication device.

In another embodiment of the sixth aspect, the updated configuration settings are transmitted over a local area network (LAN) installed at a property that the A/V recording and communication device is located.

In another embodiment of the sixth aspect, the updated configuration settings are transmitted to the A/V recording and communication device via a backend device.

In another embodiment of the sixth aspect, the backend device is one of a backend server, an application programming interface (API), and a storage device.

In a seventh aspect, an audio/video (A/V) recording and communication device including a processor, a camera, a communication module, and a light source, receives, by the processor using the communication module, from a client device associated with the A/V recording and communication device, an activation request to activate the light source; in response to receiving the activation request, activates, by the processor, the light source and recording, by the camera, image data in a field of view of the camera; receives, by the processor using the communication module, from the client device, a deactivation request to deactivate the light source; and in response to receiving the deactivation request, deactivates, by the processor, the light source and the camera.

In an embodiment of the seventh aspect, the activation request is received via a backend device.

In another embodiment of the seventh aspect, the backend device is at least one of a backend server, an application programming interface (API), and a storage device.

In another embodiment of the seventh aspect, the light source includes one of a floodlight and a spotlight.

In another embodiment of the seventh aspect, the A/V recording and communication device, in response to recording the image data, transmits, by the processor using the communication module, the image data to a backend device for storage on the backend device.

In another embodiment of the seventh aspect, the image data is recorded by the camera and transmitted to the backend device until the deactivation request is received.

In another embodiment of the seventh aspect, the A/V recording and communication device, in response to recording the image data, stores, by the processor using the communication module, the image data in a rolling buffer on a non-transitory machine-readable memory of the A/V recording and communication device.

In another embodiment of the seventh aspect, the A/V recording and communication device is one of an A/V recording and communication floodlight and an A/V recording and communication spotlight.

In another embodiment of the seventh aspect, the A/V recording and communication device receives, by the processor using the communication module, from the client device, an image data request for the image data; and in response to receiving the image data request, accesses, from the non-transitory machine-readable memory, and transmits, by the processor using the communication module, to the client device, the image data.

In another embodiment of the seventh aspect, the A/V recording and communication device transmits, by the processor using the communication module, the image data, wherein the image data includes live-streaming video.

In an eighth aspect, an audio/video (A/V) recording and communication device including a processor, a camera, a communication module, and a light source, receives, by the processor using the communication module, from a client device associated with the A/V recording and communication device, an activation request to activate the light source; in response to receiving the activation request, activates, by the processor, the light source; in response to activating the light source, records, by the camera, image data in a field of view of the camera and transmitting, by the processor using the communication module, the image data to a backend device for remote storage of the image data; receives, by the processor using the communication module, from the client device, a deactivation request to deactivate the light source; in response to receiving the deactivation request, deactivates, by the processor, the light source; and in response to deactivating the light source, deactivates, by the processor, the camera and terminates, by the processor, the transmission of the image data.

In an embodiment of the eighth aspect, the activation request is received via the backend device.

In another embodiment of the eighth aspect, the backend device is at least one of a backend server, an application programming interface (API), and a storage device.

In another embodiment of the eighth aspect, the light source includes one of a floodlight and a spotlight.

In another embodiment of the eighth aspect, the image data includes live-streaming video.

In another embodiment of the eighth aspect, the A/V recording and communication device is one of an A/V recording and communication floodlight and an A/V recording and communication spotlight.

In a ninth aspect, an audio/video (A/V) recording and communication device comprises: one or more processors; a camera; a communication module; a light source; and a non-transitory machine-readable memory storing a program, the program executable by at least one of the processors, the program comprising sets of instructions for: receiving, using the communication module, from a client device associated with the A/V recording and communication device, an activation request to activate the light source; in response to receiving the activation request, activating the light source; in response to activating the light source, recording, by the camera, image data in a field of view of the camera and transmitting, using the communication module, the image data to a backend server for remote storage of the image data; receiving, using the communication module, from the client device, a deactivation request to deactivate the light source; in response to receiving the deactivation request, deactivating the light source; and in response to deactivating the light source, deactivating the camera and terminating the transmission of the image data.

In an embodiment of the ninth aspect, the activation request is received via the backend device.

In another embodiment of the ninth aspect, the backend device is at least one of a backend server, an application programming interface (API), and a storage device.

In another embodiment of the ninth aspect, the light source includes one of a floodlight and a spotlight.

In another embodiment of the ninth aspect, the image data includes live-streaming video.

In another embodiment of the ninth aspect, the A/V recording and communication device is one of an A/V recording and communication floodlight and an A/V recording and communication spotlight.

In a tenth aspect, an audio/video (A/V) recording and communication device is provided, the A/V recording and communication device comprising: a processor, a camera, a communication module, a light source, and a non-transitory machine-readable memory storing a program, the program executable by the processor, the program comprising sets of instructions for: receiving, using the communication module, from a client device associated with the A/V recording and communication device, an activation request to activate the light source; in response to receiving the activation request, activating the light source and recording, by the camera, image data in a field of view of the camera; receiving, using the communication module, from the client device, a deactivation request to deactivate the light source; and in response to receiving the deactivation request, deactivating the light source and the camera.

In an embodiment of the tenth aspect, the activation request is received via a backend device.

In another embodiment of the tenth aspect, the backend device is at least one of a backend server, an application programming interface (API), and a storage device.

In another embodiment of the tenth aspect, the light source includes one of a floodlight and a spotlight.

In another embodiment of the tenth aspect, the program further comprises sets of instructions for in response to recording the image data, transmitting, using the communication module, the image data to a backend device for storage on the backend device.

In another embodiment of the tenth aspect, the image data is recorded by the camera and transmitted to the backend device until the deactivation request is received.

In another embodiment of the tenth aspect, the program further comprises sets of instructions for: in response to recording the image data, storing the image data in a rolling buffer on the non-transitory machine-readable memory of the A/V recording and communication device.

In another embodiment of the tenth aspect, the program further comprises sets of instructions for: receiving, using the communication module, from the client device, an image data request for the image data; and in response to receiving the image data request, accessing, from the non-transitory machine-readable memory, and transmitting, using the communication module, to the client device, the image data.

In another embodiment of the tenth aspect, the A/V recording and communication device is one of an A/V recording and communication floodlight and an A/V recording and communication spotlight.

In another embodiment of the tenth aspect, the program further comprises sets of instructions for: transmitting, using the communication module, the image data, wherein the image data includes live-streaming video.

In an eleventh aspect, a method for an audio/video (AN) recording and communication device is provided, the device including a processor, a camera, a communication module, and a light source, the method comprising: receiving, by the processor using the communication module, from a client device associated with the A/V recording and communication device, an activation request to activate the light source; in response to receiving the activation request, activating, by the processor, the light source and recording, by the camera, image data in a field of view of the camera; receiving, by the processor using the communication module, from the client device, a deactivation request to deactivate the light source; and in response to receiving the deactivation request, deactivating, by the processor, the light source and the camera.

In an embodiment of the eleventh aspect, the activation request is received via a backend device.

In another embodiment of the eleventh aspect, the backend device is at least one of a backend server, an application programming interface (API), and a storage device.

In another embodiment of the eleventh aspect, the light source includes one of a floodlight and a spotlight.

In another embodiment of the eleventh aspect, the method further comprises: in response to recording the image data, transmitting, by the processor using the communication module, the image data to a backend device for storage on the backend device.

In another embodiment of the eleventh aspect, the image data is recorded by the camera and transmitted to the backend device until the deactivation request is received.

In another embodiment of the eleventh aspect, the method further comprises: in response to recording the image data, storing, by the processor using the communication module, the image data in a rolling buffer on a non-transitory machine-readable memory of the A/V recording and communication device.

In another embodiment of the eleventh aspect, the method further comprises: receiving, by the processor using the communication module, from the client device, an image data request for the image data; and in response to receiving the image data request, accessing, from the non-transitory machine-readable memory, and transmitting, by the processor using the communication module, to the client device, the image data.

In another embodiment of the eleventh aspect, the A/V recording and communication device is one of an A/V recording and communication floodlight and an A/V recording and communication spotlight.

In another embodiment of the eleventh aspect, the method further comprises: transmitting, by the processor using the communication module, the image data, wherein the image data includes live-streaming video.

BRIEF DESCRIPTION OF THE DRAWINGS

The various embodiments of the setup and configuration of audio/video (A/V) recording and communication devices now will be discussed in detail with an emphasis on highlighting the advantageous features. These embodiments depict novel and non-obvious setup and configuration of A/V recording and communication devices shown in the accompanying drawings, which are for illustrative purposes only. These drawings include the following figures, in which like numerals indicate like parts:

FIGS. 10-13 are flowcharts illustrating processes setup and configuration of A/V recording and communication devices according to various aspects of the present disclosure;

DETAILED DESCRIPTION

Figure 1:
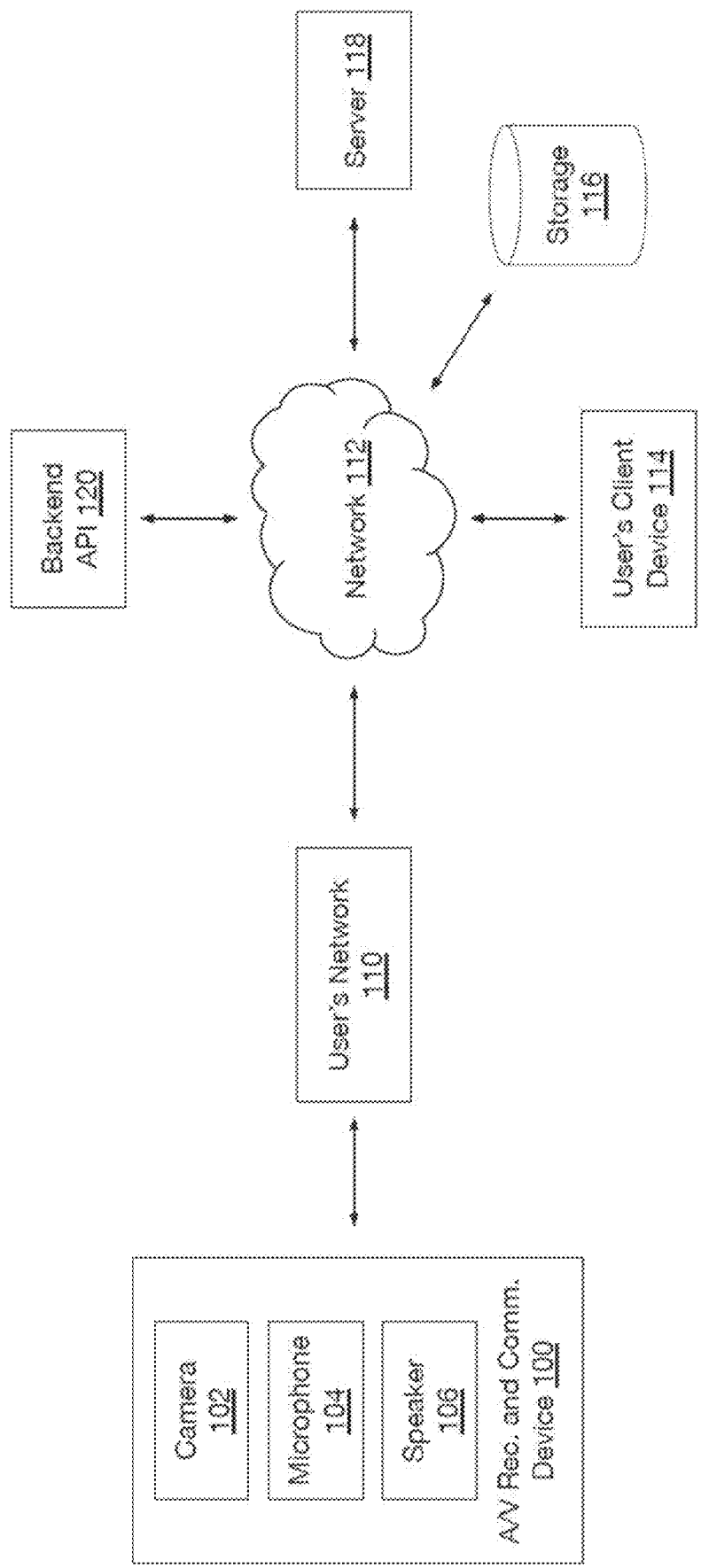
FIG. 1 is a functional block diagram illustrating one embodiment of a system including an A/V recording and communication device according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

With reference to FIG. 1, the present embodiments may include an A/V recording and communication device 100 (e.g., a video doorbell, a security camera, a floodlight camera, a spotlight camera, etc.). The A/V recording and communication device 100 may be located near the entrance to a structure (not shown), such as a dwelling, a business, a storage facility, etc., or may be located along the outside of the property, such as above a garage, below a roof, at the corner of the property, etc. The A/V recording and communication device 100 may include a camera 102, a microphone 104, and a speaker 106. The camera 102 may comprise, for example, a high definition (HD) video camera, such as one capable of capturing video images at an image display resolution of 720p, or 1080p, or better. While not shown, the A/V recording and communication device 100 may also include other hardware and/or components, such as memory (e.g., volatile and/or non-volatile memory), a housing, one or more sensors (e.g., motion sensors, temperature sensor, etc.), one or more buttons (e.g., a doorbell button, a reset button, etc.), etc., as is described in more detail below with respect to FIGS. 2-4.

Additionally, the present disclosure provides numerous examples of methods and systems including A/V recording and communication devices that are powered by a connection to AC mains, but the present embodiments are equally applicable for A/V recording and communication devices that are battery powered. The A/V recording and communication device 100 may further include similar componentry and/or functionality as the wireless communication doorbells described in U.S. Pat. No. 9,584,775 (application Ser. No. 14/499,828) and U.S. Patent Publication No. 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 may be connected to another network 112, which may comprise, for example, the Internet and/or a public switched telephone network (PSTN). As described below, the A/V recording and communication device 100 may communicate with the user's client device 114 via the network 110 and/or the network 112 (Internet/PSTN). The user's client device 114 may comprise, for example, a mobile telephone (may also be referred to as a cellular telephone), such as a smartphone, a personal digital assistant (PDA), or another communication device. The user's client device 114 may comprise a display (not shown) and related components capable of displaying streaming and/or recorded video images. The user's client device 114 may also comprise a speaker and related components capable of broadcasting streaming and/or recorded audio, and may also comprise a microphone.

The user's network 110 may also be connected to other A/V recording and communication devices, such as the A/V recording and communication device 100, and/or other types of alert devices (e.g., in-home and outside alert devices) which are not shown in FIG. 1. An alert device, in some of the present embodiments, comprises a device that is capable of providing audible and/or visual alerts. Some examples of alert devices may include, but not limited to, a speaker capable of generating different sounds and/or verbal warnings, a light (e.g., a smart LED light bulb) capable of emitting light in different colors, etc.

The A/V recording and communication device 100 may also communicate with one or more remote storage device(s) 116 (may be referred to interchangeably as "cloud storage device(s)"), one or more servers 118, and/or a backend API (application programming interface) 120 via the network 110 (e.g., a personal wired or wireless network) and the network 112 (e.g., Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network, any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection.

Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 may detect the visitor's presence and begin capturing video images within a field of view of the camera 102. The A/V communication device 100 may also capture audio through the microphone 104. The A/V recording and communication device 100 may detect the visitor's presence using the camera 102, one or more motion sensors (not shown), and/or by detecting that the visitor has depressed a button (e.g., a doorbell button) on the A/V recording and communication device 100 (in embodiments where the A/V recording and communication device 100 includes a button).

In response to the detection of the visitor, the A/V recording and communication device 100 may send an alert to the user's client device 114 (FIG. 1) via the user's network 110 and/or the network 112. The A/V recording and communication device 100 may also send streaming video, as well as streaming audio, to the user's client device 114. If the user answers the alert, a two-way audio communication session may then be established between the visitor and the user through the A/V recording and communication device 100 and the user's client device 114. The user may view the visitor throughout the duration of the call, but the visitor may or may not be capable of viewing the user, depending on the specific embodiment. For example, in some embodiments, the A/V recording and communication device 100 may include a display screen (not shown), through which the visitor can also see the user (e.g., when the user desires). In some of the present embodiments, in addition to the above-described alert, a visual and/or verbal notification may be provided to any persons present at the property (e.g., when the visitor is determined to pose a threat, when the user has shown a higher level of interest in the visitor, etc.).

The video images captured by the camera 102 of the A/V recording and communication device 100 (and the audio captured by the microphone 104) may be uploaded to the cloud and recorded on the remote storage device 116. In some embodiments, the video and/or audio may be recorded on the remote storage device 116 even if the user chooses to ignore the alert sent to his or her client device 114.

With further reference to FIG. 1, the system may further comprise a backend application programming interface (API) 120 including one or more components. A backend API may comprise, for example, a server (e.g., a physical server, a virtual machine, a machine running in a cloud infrastructure as a service, etc.), or multiple servers networked together, exposing at least one API to client(s) accessing it. These servers may include components such as application servers (e.g., software servers), depending upon what other components are included, such as a caching layer, or database layers, or other components. A backend API may, for example, comprise many such applications, each of which communicate with one another using their public APIs. In some embodiments, the backend API may hold the bulk of the user data and offer the user management capabilities, leaving the clients to have very limited state.

As an example, in some of the present embodiments one or more API servers may receive (e.g., from the A/V recording and communication device 100) captured images and/or biometric data of a person at an entry of a property and use the received images/data to determine whether the person poses a threat or not. One or more of these backend servers may employ a set of computer vision processes (e.g., face recognition, iris recognition, or any other biometrics recognition process) and one or more databases (e.g., a database for convicted felons, registered sex offenders, etc.) to recognize and report the severity of the threat (e.g., the threat level associated with the person).

The backend API 120 illustrated in FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming graphical user interface (GUI) components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
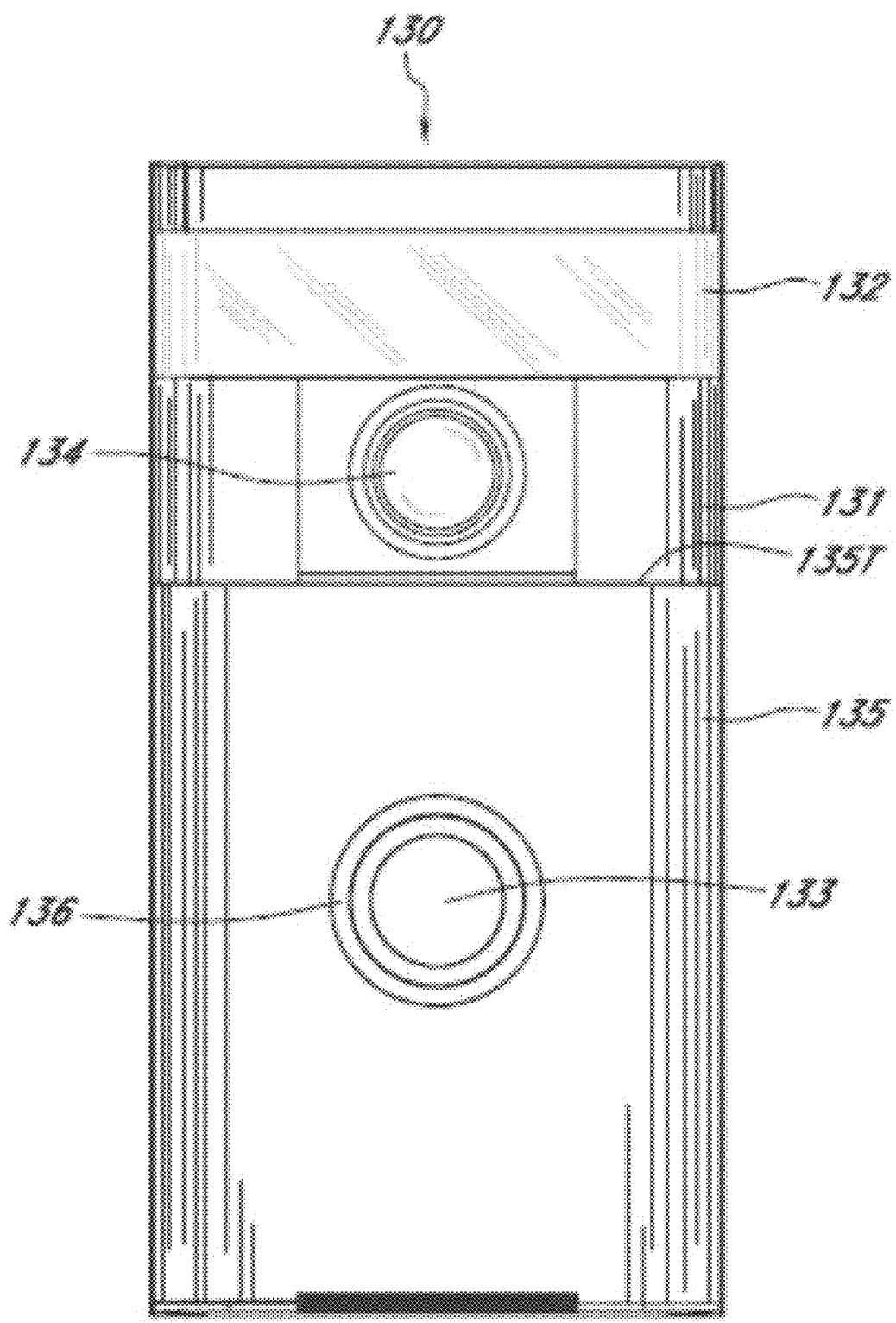
FIG. 2 is a front view of an A/V recording and communication doorbell, according to an aspect of the present disclosure.

FIG. 2 illustrates an A/V recording and communication doorbell (also referred to as a video doorbell, or simply a doorbell, in some embodiments), according to an aspect of the present disclosure. FIG. 2 illustrates that the front of the A/V recording and communication doorbell 130 includes a front button 133, a faceplate 135, and a light pipe 136. The button 133 may make contact with a button actuator (not shown) located within the A/V recording and communication doorbell 130 when the button 133 is pressed by a visitor. When pressed, the button 133 may trigger one or more functions of the A/V recording and communication doorbell 130, as further described below. The front button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's), contained within the doorbell 130. In some aspects of the present embodiments when the battery 166 of the doorbell 130 is recharged through a connection to AC mains power, the LEDs may emit light to indicate that the battery 166 is being recharged.

With further reference to FIG. 2, the doorbell 130 further includes an enclosure 131 that engages the faceplate 135 in some aspects of the present embodiments. In the illustrated embodiment, the enclosure 131 abuts an upper edge 135T of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described above and below.

Figure 3:
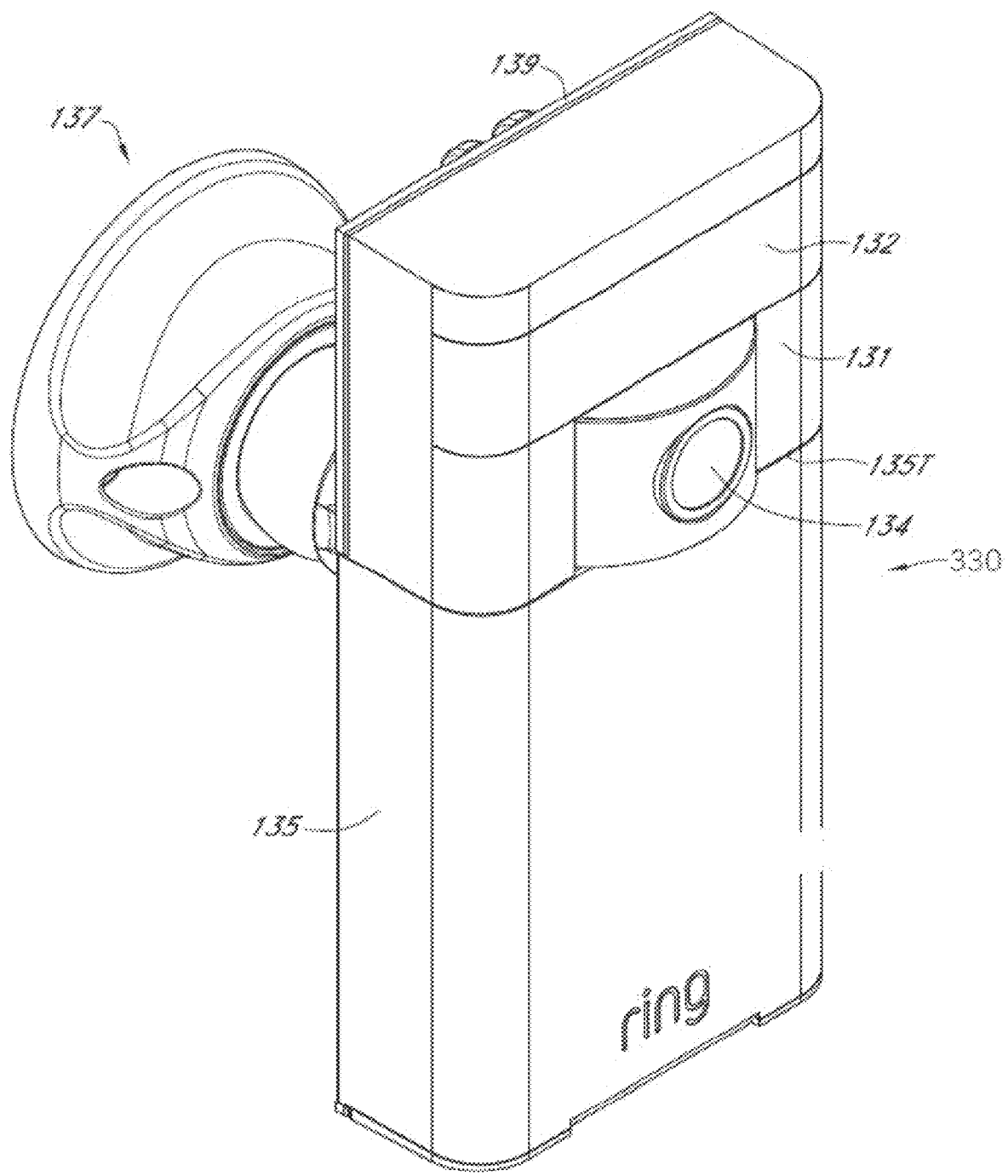
FIG. 3 is an upper front perspective view of an A/V recording and communication security camera, according to an aspect of the present disclosure.

FIG. 3 shows an A/V recording and communication camera (also referred to as a security camera in some embodiments), according to an aspect of the present embodiments. This figure illustrates that the A/V recording and communication camera 330, similar to the A/V recording and communication doorbell 130, includes a faceplate 135 that is mounted to a back plate 139 and an enclosure 131 that engages the faceplate 135. Collectively, the faceplate 135, the back plate 139, and the enclosure 131 form a housing that contains and protects the inner components of the A/V recording and communication camera 330. However, unlike the A/V recording and communication doorbell 130, the A/V recording and communication camera 330 may not include any front button 133 (e.g., because the A/V recording and communication camera 330 may not function as a doorbell). The faceplate 135 may comprise any suitable material, including, without limitation, metals, such as brushed aluminum or stainless steel, metal alloys, or plastics. The faceplate 135 protects the internal contents of the A/V recording and communication camera 330 and serves as an exterior front surface of the A/V recording and communication camera 330.

With continued reference to FIG. 3, the enclosure 131 engages the faceplate 135 and abuts an upper edge 135T of the faceplate 135. As discussed above with reference to FIG. 2, in alternative embodiments, one or more gaps between the enclosure 131 and the faceplate 135 may facilitate the passage of sound and/or light through the A/V recording and communication camera 330. The enclosure 131 may comprise any suitable material, but in some embodiments the material of the enclosure 131 preferably permits infrared light to pass through from inside the A/V recording and communication camera 330 to the environment and vice versa. The A/V recording and communication camera 330 further includes a lens 132. Again, similar to the A/V recording and communication doorbell 130, in some embodiments, the lens may comprise a Fresnel lens, which may be patterned to deflect incoming light into one or more infrared sensors located within the A/V recording and communication camera 330. The A/V recording and communication camera 330 further includes a camera 134, which captures video data when activated, as described herein.

With further reference to FIG. 3, the enclosure 131 may extend from the front of the A/V recording and communication camera 330 around to the back thereof and may fit snugly around a lip (not shown) of the back plate 139. The back plate 139 may comprise any suitable material, including, without limitation, metals, such as brushed aluminum or stainless steel, metal alloys, or plastics. The back plate 139 protects the internal contents of the A/V recording and communication camera 330 and serves as an exterior rear surface of the A/V recording and communication camera 330. The faceplate 135 may extend from the front of the A/V recording and communication camera 330 and at least partially wrap around the back plate 139, thereby allowing a coupled connection between the faceplate 135 and the back plate 139. The back plate 139 may have indentations (not shown) in its structure to facilitate the coupling.

With continued reference to FIG. 3, the A/V recording and communication camera 330 may further comprise a mounting apparatus 137. The mounting apparatus 137 facilitates mounting the A/V recording and communication camera 330 to a surface, such as an interior or exterior wall of a building, such as a home or office. The faceplate 135 may extend from the bottom of the A/V recording and communication camera 330 up to just below the camera 134, and connect to the back plate 139 as described above. The lens 132 may extend and curl partially around the side of the A/V recording and communication camera 330. The enclosure 131 may extend and curl around the side and top of the A/V recording and communication camera 330, and may be coupled to the back plate 139 as described above. The camera 134 may protrude from the enclosure 131, thereby giving it a wider field of view. The mounting apparatus 137 may couple with the back plate 139, thereby creating an assembly including the A/V recording and communication camera 330 and the mounting apparatus 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 4:
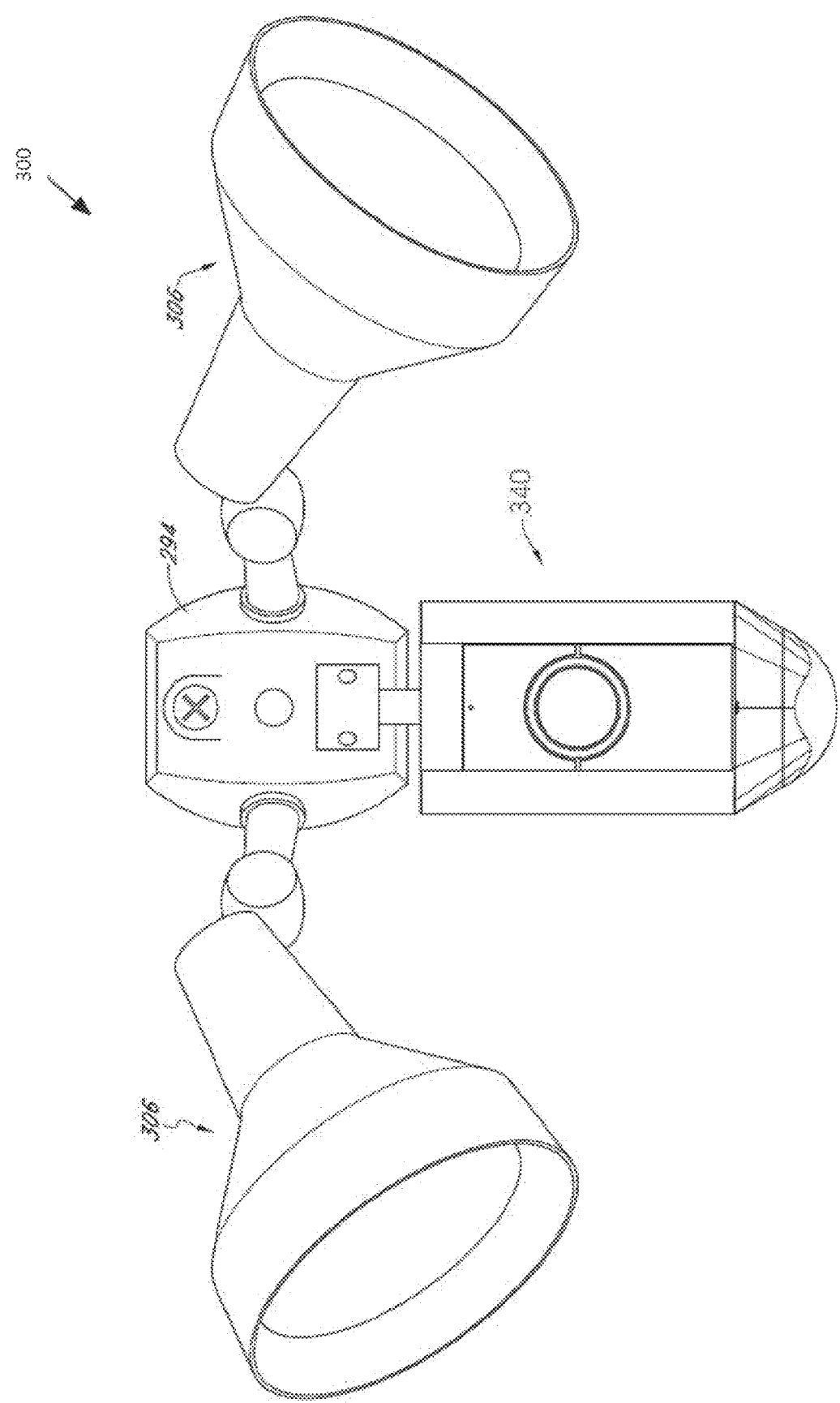
FIG. 4 is a front view of an A/V recording and communication floodlight camera, according to an aspect of the present disclosure.

FIG. 4 illustrates an A/V recording and communication floodlight (also referred to as a floodlight camera in some embodiments), according to an aspect of the present disclosure. The A/V recording and communication floodlight 300, in some embodiments, includes a floodlight controller 340, one or more floodlights 306, and a mounting plate/bracket 294 for mounting the A/V recording and communication floodlight 330 to a mounting surface (e.g., a wall of a property). The floodlight controller 340 may perform all of the functionalities described above, with reference to FIG. 1, for the A/V recording and communication device 100 (e.g., detect motion, record video from the area about the A/V recording and communication floodlight 330, two-way audio communication, etc.). Additionally, the floodlight controller 340 may be configured to activate (illuminate) the floodlights 306 when motion is detected in the area about the A/V recording and communication floodlight 330. Similar to the A/V recording and communication device 100, the floodlight controller 340 may include a camera, a microphone, a speaker, one or motion sensors, a wireless communication module, and/or other features and functionality. The floodlight controller 340 may communicate with a user's network, such as the user's network 110. The floodlight controller 340 may also communicate with a user's client device, such as the user's client device 114, with one or more remote storage device(s), such as the storage device 116, with one or more servers, such as the server 118, and with a backend API such as the backend API 120.

In response to the detection of a visitor, the floodlight controller 340 may be activated and turn on the floodlights 306 to illuminate the area about the A/V recording and communication floodlight 330. The floodlight controller 340 may also send an alert to the user's client device 114 (FIG. 1) via the user's network 110 and the network 112 to inform the user about the presence of a visitor (or an intruder). The floodlight controller 340 may also send streaming video and/or audio to the user's client device 114 via the user's network 110 and the network 112. If the user answers the alert, two-way audio communication may then occur between the visitor and the user through the floodlight controller 340 and the user's client device 114. The user may view the visitor throughout the duration of the communication, but the visitor may not be capable of viewing the user (e.g., because the A/V recording and communication floodlight 300 may not include a display).

With further reference to FIG. 4, in some embodiments, the present floodlight controller 340 may include one or more light-emitting elements (distinct from the floodlights 306). For example, the floodlight controller 340 may include a set of light-emitting elements located at a lower end of the floodlight controller 340. In some of the present embodiments, the light-emitting elements may comprise light-emitting diodes (LEDs). However, in other embodiments the light-emitting elements may comprise any other type of device that emits light. In some embodiments, the light-emitting elements may comprise LEDs capable of producing a variety of colors of light, such as blue, red, green, or any other color and/or color combination. The light-emitting elements may be configured to provide a visual warning to an intruder, and may further be configured to be remotely controlled by a user through an application executing on the user's client device 114.

The application executing on the user's client device 114 may provide one or more options for the user to remotely control the operation (illumination) of the light-emitting elements. For example, the application may display on the display of the user's client device 114 one or more buttons (or another type of command/input element) enabling the user, who may be on the premises or at a remote location, to turn on the light-emitting elements, to change the color of the light-emitting elements, to cause the light-emitting elements to flash, etc. Light emitted by the light-emitting elements may provide a visual indicator or warning to the visitor/intruder. For example, a steady or flashing red light (or any other color) may provide a visual warning to an intruder that may cause the intruder to flee. The steady or flashing red light (or any other color) may further provide a visual cue to any neighbors or passersby of an emergency situation, which may attract the aid or assistance of others to neutralize any danger, such as by causing the intruder to flee.

With further reference to FIG. 4, the speaker of the floodlight controller 340 may be configured to emit a sound to startle and/or repel any person within earshot of the speaker, such as a loud beep, whoop, squawk, or any other type of loud noise, when motion is detected in the area about the A/V recording and communication floodlight 330. The repelling sound (also referred to herein as a siren or an alarm), in some embodiments, may be remotely controlled by the user through the application executing on the user's client device 114. For example, when the user is viewing the live video stream from the camera 104, the application may display on the display of the user's client device 114 one or more buttons (or another type of command/input element) enabling the user to activate the siren. The siren may, in some embodiments, be configured to emit sound(s) at very loud volumes, such as 100 dB or more. Activation of the siren may advantageously cause any intruder(s) within earshot of the speaker to flee.

As described above, the present A/V recording and communication floodlight 330 with video recording and two-way audio capabilities provides stronger crime deterrence than typical floodlight devices because a user can speak directly to an intruder through the floodlight controller, and because video footage captured by the floodlight controller can be used to identify criminal perpetrators. Enabling the user to speak directly to an intruder creates the illusion that the user is present at the property (while the user might be hundreds of miles away from the property), thereby making it more likely that the intruder will flee.

The A/V recording and communication floodlight 330 described above is one example of an A/V recording and communication security device of the present embodiments. Some of the present embodiments may provide other security devices that comprise an A/V recording and communication controller and one or more illumination sources, such as the floodlights 306. As an example, some of the present embodiments may provide a spotlight camera that includes an A/V recording and communication controller with a set of high-lumen LEDs that function as the floodlights 306 built into the A/V recording and communication controller.

Figure 5:
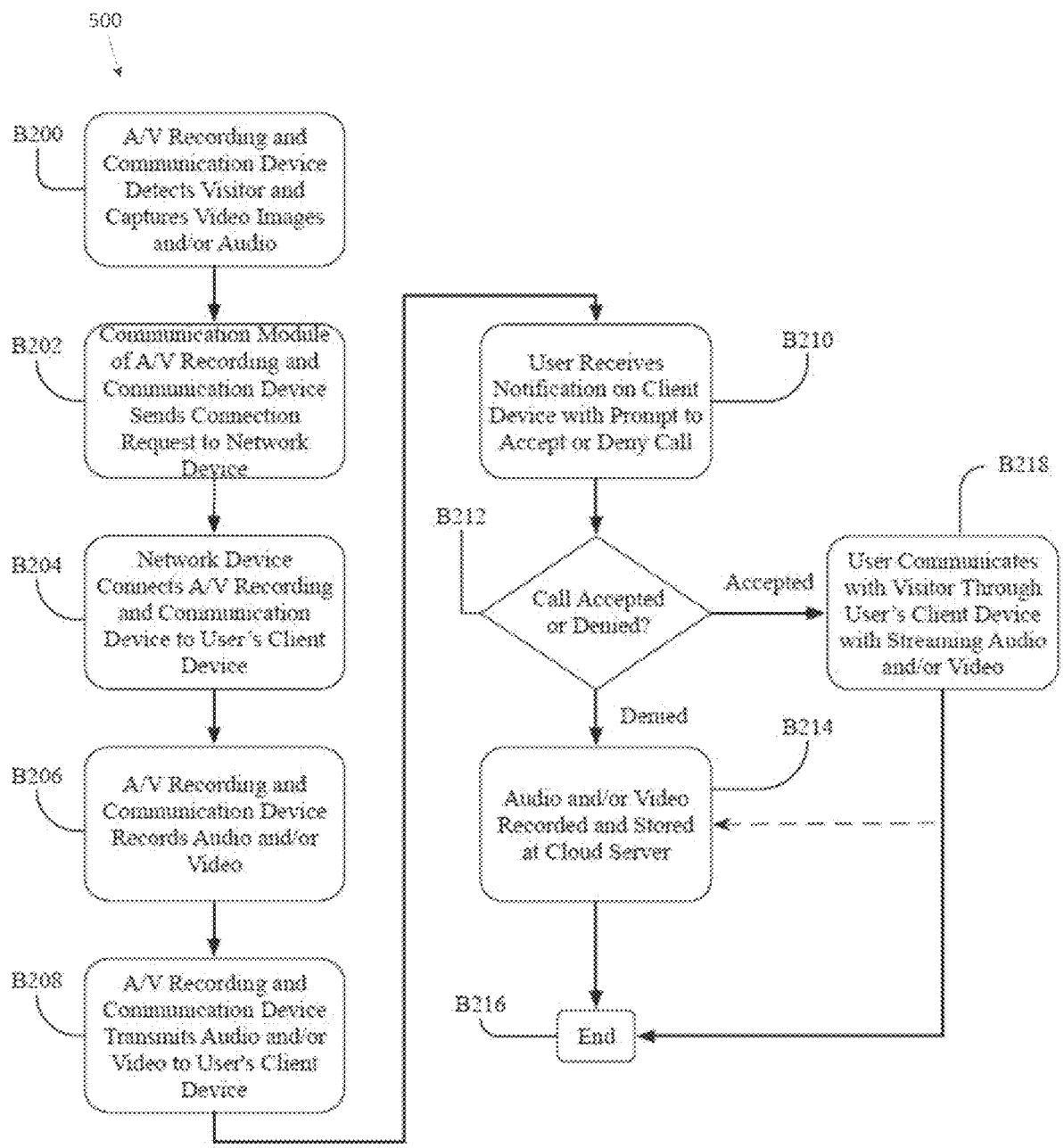
FIG. 5 is a flowchart illustrating a process for streaming and storing A/V content from an A/V recording and communication device, according to various aspects of the present disclosure.

FIG. 5 is a flowchart illustrating a process 500 for streaming and storing A/V content from the A/V recording and communication device 100 (e.g., the A/V recording and communication doorbell 130, the A/V recording and communication camera 330, the A/V recording and communication floodlight 330, etc.), according to various aspects of the present disclosure. At block B200 of the process 500, the A/V recording and communication device 100 detects a visitor's presence and captures video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor(s), and/or by detecting that the visitor has pressed a front button of the A/V recording and communication device 100 (if the A/V recording and communication device 100 is a doorbell). Also, as described above, the video recording/capture may begin when the visitor is detected, or may begin earlier, as described below.

At block B202 of the process 500, a communication module of the A/V recording and communication device 100 sends a request, e.g., via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block B204 of the process 500, the network device may connect the A/V recording and communication device 100 to the user's client device 114, e.g., through the user's network 110 and the network 112. At block B206 of the process 500, the A/V recording and communication device 100 may record available audio and/or video data using the camera 102, the microphone 104, and/or any other device/sensor available. At block B208 of the process 500, the audio and/or video data is transmitted (e.g., streamed) from the A/V recording and communication device 100 to the user's client device 114 via the user's network 110 and the network 112. At block B210 of the process 500, the user may receive a notification on his or her client device 114 with a prompt to either accept or deny the call.

At block B212, the process 500 determines whether the user has accepted or denied the call. If the user denies the notification, then the process 500 advances to block B214, where the audio and/or video data is recorded and stored at a cloud server. The session then ends at block B216 of the process 500, and the connection between the A/V recording and communication device 100 and the user's client device 114 is terminated. If, however, the user accepts the notification (or call), then at block B218 of the process 500, the user can communicate with the visitor through the user's client device 114 while audio and/or video data captured by the camera 102, the microphone 104, and/or other devices/sensors is streamed to the user's client device 114. In some of the present embodiments it is up to the user to enable the visitor to hear the user's voice (or to see a video of the user in some embodiments) by selecting/unselecting a voice and/or video option during the communication session. At the end of the call, the user may terminate the connection between the user's client device 114 and the A/V recording and communication device 100 and the communication session ends at block B216 of the process 500. In some embodiments, the audio and/or video data may be recorded and stored at a cloud server (at block B214) even if the user accepts the notification and communicates with the visitor through the user's client device 114.

The specific operations of the above-described process 500 may not be performed in the exact order shown and described. For example, in some aspects of the present embodiments block B210 may be performed before block B208. That is, the A/V recording and communication device 100 may send a notification (e.g., upon detecting the visitor's presence) to the user (e.g., to the user's client device 114) before transmitting the audio and/or video data to the client device 114 (e.g., through the user's network 110 and the network 112). Furthermore, the specific operations may not be performed in one continuous series of operations, and different specific operations may be performed in different embodiments.

Some of the present embodiments may comprise computer vision for one or more aspects, such as object and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Typical functions and components (e.g., hardware) found in many computer vision systems are described in the following paragraphs. The present embodiments may include at least some of these aspects. For example, with reference to FIG. 3, embodiments of the present A/N recording and communication doorbell 130 may include a computer vision module 163. The computer vision module 163 may include any of the components (e.g., hardware) and/or functionality described herein with respect to computer vision, including, without limitation, one or more cameras, sensors, and/or processors. In some of the present embodiments, the microphone 150, the camera 154, and/or the imaging processor 240 may be components of the computer vision module 163.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the computer vision module 163). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, the computer vision module 163, and/or the camera 154 and/or the processor 160 may receive information about the person using any one, or any combination of more than one, of the foregoing biometrics.

As discussed above, one aspect of the present embodiments includes the realization that A/V recording and communication devices may require updates to the configuration settings (e.g., network connectivity settings, motion settings, etc.) from time to time. In order to update the configuration settings, the A/V recording and communication device may require that the user of the device manually put the A/V recording and communication device into a device setup mode (e.g., by pressing a setup button on the device). However, A/V recording and communication devices may be mounted out of reach of the user (e.g., above a garage door, along the roof line of the property, etc.) and/or may be difficult to detach from their installation point (e.g., require removing multiple screws, detaching wires, etc.).

The present embodiments solve this problem by leveraging the functionality of A/V recording and communication devices to activate a device setup mode in response to a device setup tone. For example, a user may transmit the device setup tone from their client device using an application associated with the A/V recording and communication device. In response to playing the device setup tone, the A/V recording and communication device may receive the tone using a microphone and activate the device setup mode. As a result, the A/V recording and communication device is capable of being reconfigured (e.g., receiving updated configuration settings) without the user having to manually interact with the device. Ultimately, the user may be more likely to reconfigure the A/V recording and communication device when the device needs to be reconfigured (e.g., when the network credentials for the user's network that the A/V recording and communication device is connected to have changed). By reconfiguring the device sooner, the A/V recording and communication device is able to provide the intended safety and security to the property at an earlier time, thereby contributing to the safety of the property, the neighborhood, and the public safety as a whole.

For example, in one embodiment, an A/V recording and communication device including a processor and a microphone, activates, by the processor, the microphone to record audio data; analyzes, by the processor, the audio data; determines, by the processor based on the analysis of the audio data, that the audio data includes a device setup tone; and in response to the determination that the audio data includes the device setup tone, activates, by the processor, a device setup mode of the A/V recording and communication device.

Another aspect of the present embodiments includes the realization that for A/V recording and communication devices including a light source (e.g., a floodlight, a spotlight, etc.), other the present embodiments, when the light source is manually turned on at the request of a user of the A/V recording and communication device, the camera does not always record video footage. For example, the user may have to manually turn on the light source (e.g., using their client device) and also separately turn on the camera to record video (e.g., by activating a live view setting using their client device). However, the user, in some situations, may activate the light source in response to a suspicion of suspicious activity in the field of view of the A/V recording and communication device. In situations where there is in fact suspicious activity taking place, because the camera may not start recording in response to the light source being turned on, the user may not capture the suspicious activity and thus may not be able to reference the video footage for determining the cause of the suspicious activity (e.g., the identity of the person or the activity taking place).

The present embodiments solve this problem by leveraging the functionality of A/V recording and communication devices to activate the camera to record video in response to the light source being turned on. For example, the A/V recording and communication device may record the video and save the video locally, and/or may transmit the video to a backend device for storage. As a result, the user may be able to view the video footage to determine the cause of the suspicious activity.

For example, in one embodiment, an A/V recording and communication device including a processor, a communication module, a light source, and a camera, receives, by the processor using the communication module, from a client device associated with the A/V recording and communication device, an activation request to activate the light source; in response to receiving the activation request, activates, by the processor, the light source and recording, by the camera, image data in a field of view of the camera; receives, by the processor using the communication module, from the client device, a deactivation request to deactivate the light source; and in response to receiving the deactivation request, deactivates, by the processor, the light source and the camera.

Figure 6:
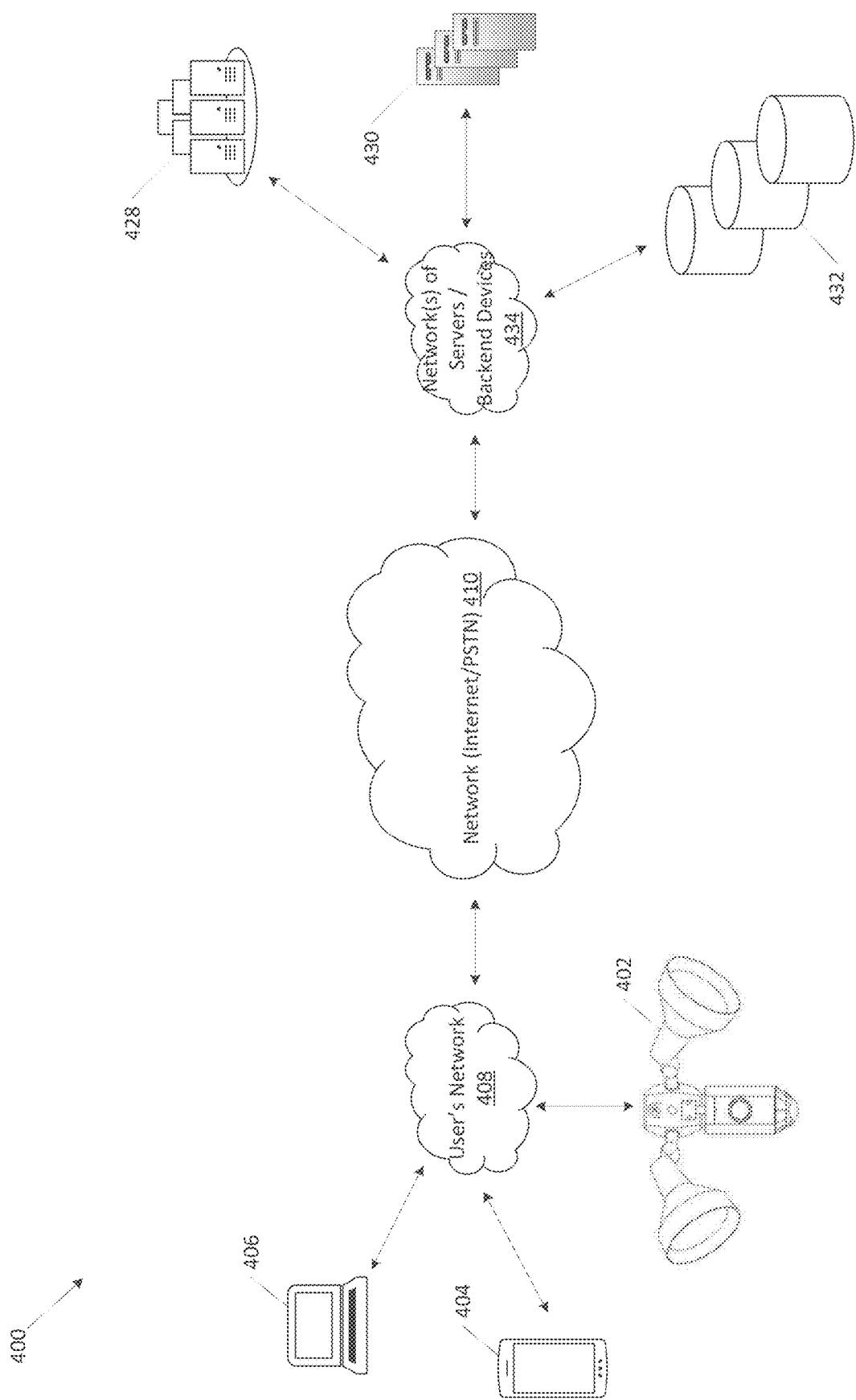
FIG. 6 is a is a functional block diagram illustrating a system for communicating in a network according to various aspects of the present disclosure.

Now referring to FIG. 6, FIG. 6 is a functional block diagram illustrating a system 400 for communicating in a network according to various aspects of the present disclosure. The system 400 may include one or more audio/video (A/V) recording and communication devices 402 configured to access a user's network 408 to connect to a network (Internet/PSTN) 410. The one or more A/V recording and communication devices 402 may include any or all of the components and/or functionality of the A/V recording and communication device 100 (FIG. 1) the A/V recording and communication doorbell 130 (FIG. 2), the A/V recording and communication camera 330 (FIG. 3), and/or the A/V recording and communication floodlight (FIG. 4). Additionally, the one or more A/V recording and communication devices 402 may be configured to execute the process 500 (FIG. 5).

The user's network 408 may include any or all of the components and/or functionality of the user's network 110 described herein. The network (Internet/PSTN) 410 may include any or all of the components and/or functionality of the network (Internet/PSTN) 112 described herein.

The system 400 may also include one or more client devices 404, 406, which in various embodiments may be configured to be in network communication and/or associated with the A/V recording and communication device 402. In some of the present embodiments, the client devices 404, 406 may be configured to be in network communication with one or more backend devices, such as the backend server(s) 430. The client devices 404, 406 may comprise, for example, a mobile phone such as a smartphone, or a computing device such as a tablet computer, a laptop computer, a desktop computer, etc. The client devices 404, 406 may include any or all of the components and/or functionality of the client device 114 and/or the client device 800 described herein. In some embodiments, the client devices 404, 406 may not be associated with the A/V recording and communication device 402.

With further reference to FIG. 6, the system 400 may also include various backend devices such as (but not limited to) storage devices 432, backend servers 430, and backend APIs 428 that may be in network communication with the A/V recording and communication device 402 and/or the client devices 404, 406. In some embodiments, the storage devices 432 may be a separate device from the backend servers 430 (as illustrated) or may be an integral component of the backend servers 430. The storage devices 432 may be similar in structure and/or function to the storage device 116 (FIG. 1). In addition, in some embodiments, the backend servers 430 and backend APIs 428 may be similar in structure and/or function to the server 118 and the backend API 120 (FIG. 1), respectively.

Figure 7:
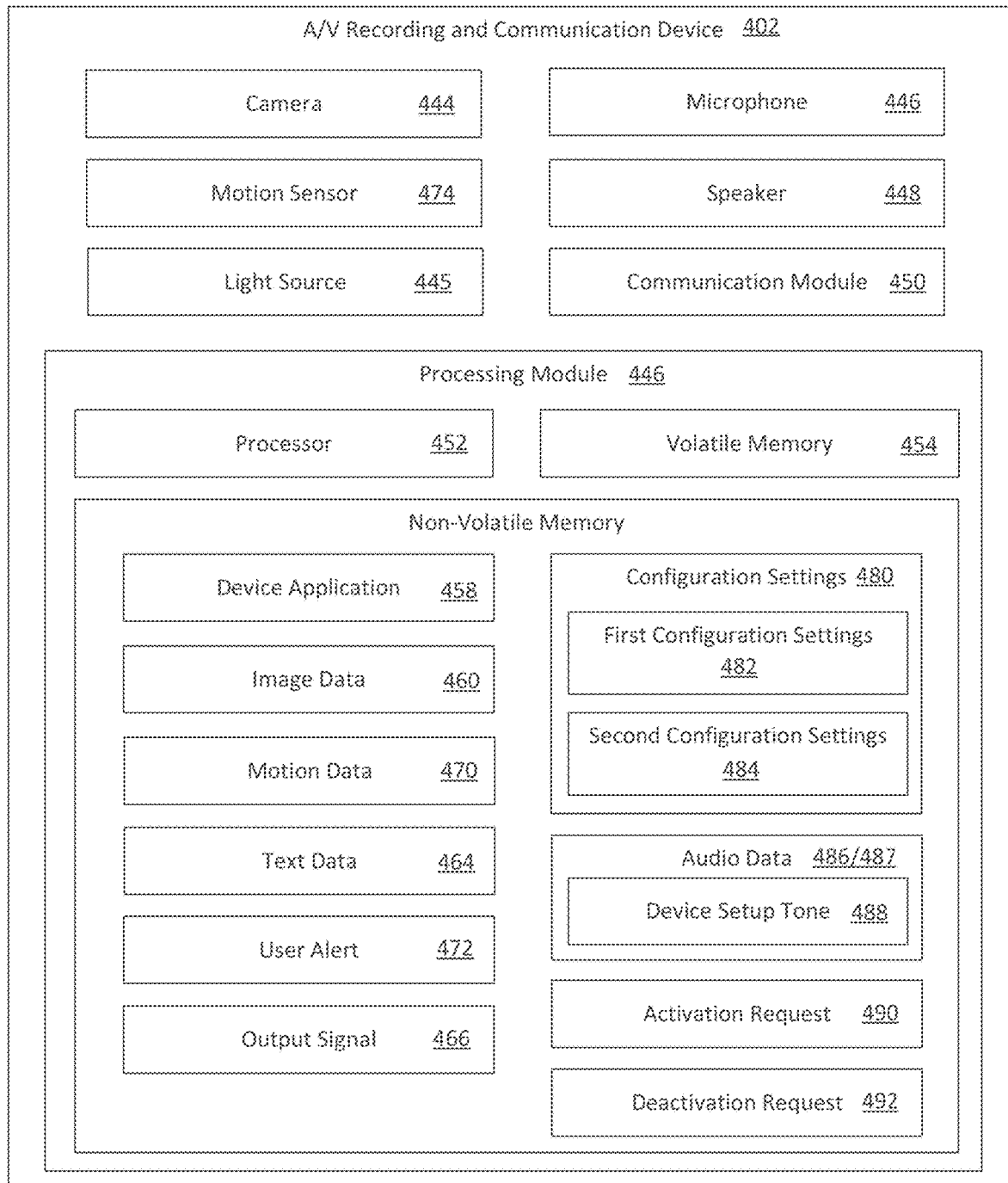
FIG. 7 is a functional block diagram illustrating one embodiment of an A/V recording and communication device according to various aspects of the present disclosure.

FIG. 7 is a functional block diagram illustrating an embodiment of the A/V recording and communication device 402 according to various aspects of the present disclosure. The A/V recording and communication device 402 may comprise a processing module 446 that is operatively connected to a camera 444, a microphone 446, a speaker 448, a motion sensor 474, a light source 445, and a communication module 450. The processing module 446 may comprise a processor 452, volatile memory 454, and non-volatile memory 456 that includes a device application 458. In various embodiments, the device application 458 may configure the processor 452 to capture image data 460 using the camera 444, audio data 462 using the microphone 446, and/or motion data 470 using the motion sensor 474 and/or the camera 444. In some embodiments, the device application 458 may also configure the processor 452 to generate text data 464 describing the image data 460, the audio data 462, and/or the motion data 470, such as in the form of metadata, for example. In some of the present embodiments, the device application 458 may also configure the processor 452 to activate (e.g., turn on) and/or deactivate (e.g., turn off) the light source 445. In some of the present embodiments, the light source 445 may be activated in response to receiving an activation request 490 and may be deactivated in response to receiving a deactivation request 492. In some embodiments, the device application 458 may configure the processor 452 to update the configuration settings 480 (e.g., the first configuration settings 482) of the A/V recording and communication device 402 in response to receiving updated configuration settings (e.g., the second configuration settings 484) from the client devices 404, 406 and/or the backend server 430. As described herein, the updated configuration settings may be received in response to the A/V recording and communication device 402 activating a device setup mode. The device setup mode may be activated in response to the A/V recording and communication device 402 receiving, via the microphone 446, the device setup tone 488 from the client devices 404, 406.

In addition, the device application 458 may configure the processor 452 to transmit the image data 460, the audio data 462, the motion data 470, and/or the text data 464 to the client devices 404, 406 and/or the backend server 430 using the communication module 450. In some of the present embodiments, the device application 458 may configure the processor 452 to generate and transmit a user alert 472 to the client devices 404, 406 (in some embodiments, via the backend server 430) in response to motion events, for example. When the user/owner receives the user alert 472 on the client device 404, 406, the user/owner may know that the device 402 is active, and thus the microphone 446 is active, and in response, the user/owner may activate the client device 404 to broadcast the device setup tone 488 for putting the A/V recording and communication device 402 into the device setup mode.

In various embodiments, the device application 458 may also configure the processor 452 to generate and transmit an output signal 466 that may include the image data 460, the audio data 462, the text data 464, and/or the motion data 470. In some of the present embodiments, the output signal 466 may be transmitted to the backend server(s) 430 using the communication module 450, and the backend server(s) 430 may transmit (or forward) the output signal 466 to the client devices 404, 406. In other embodiments, the output signal 466 may be transmitted directly to the client devices 404, 406.

In further reference to FIG. 7, the image data 460 may comprise image sensor data such as (but not limited to) exposure values and data regarding pixel values for a particular sized grid. The image data 460 may include still images, live video, and/or pre-recorded video. The image data 460 may be recorded by the camera 444 in a field of view of the camera 444.

In further reference to FIG. 7, the motion data 470 may comprise motion sensor data generated in response to motion events. For example, in embodiments using a motion sensor 474, the motion data 470 may include an amount or level of a data type generated by the motion sensor 474. In some of the present embodiments, such as those where the A/V recording and communication device 402 is similar to that of the A/V recording and communication doorbell 130 of FIG. 2, the motion data 470 may be generated by the camera 444. In such embodiments, the A/V recording and communication doorbell 402 may not include the motion sensor 474.

The configuration settings 480 may include the settings for connecting to the user's network 408, the sensitivity settings for motion detection, the settings for the motion zones (e.g., the zones where the user/owner desires and does not desire to receive user alerts 472), the power consumption settings (in embodiments where the A/V recording and communication device 402 includes a battery, the live view settings (e.g., whether or not to enable live view, at what video quality to transmit the image data 460 when in the live view, etc.), the image quality settings for the image data 460, and/or other configuration settings 480 of the A/V recording and communication device 402. The first configuration settings 482 may include the current configuration settings 480 of the device 402 (e.g., the default settings), and the second configuration settings 484 may be the updated configuration settings 480 which may be received in response to the A/V recording and communication device 402 entering the device setup mode (e.g., in response to detecting the device setup tone 488).

The activation request 490 and the deactivation request 492 may be requests to turn on and off the light source 445 of the A/V recording and communication device 402, respectively. In some of the present embodiments, the activation request 490 and the deactivation request 492 may be the same request and, when received by the A/V recording and communication device 402 from the backend server 430 and/or the client device 404, may turn on or off the light source 445 dependent on the current status of the light source 445 (e.g., if the light source 445 is on, the deactivation/activation signal may turn off the light source 445, and if the light source 445 is off, the deactivation/activation signal may turn on the light source 445). In some embodiments, in response to receiving the activation request 490, the A/V recording and communication device 402 may begin recording the image data 460 during the time that the light source 445 is turned on (e.g., until the deactivation request 490 is received and/or until the light source 445 turns off based on a timer, etc.). In such embodiments, the image data 460 may be recorded in the background (e.g., the user alert 472 may not be generated and/or the image data 460 may not be transmitted to the client device 404). However, the image data 460 may be stored locally by the A/V recording and communication device 402, the image data 460 may be transmitted to the backend server 430 for storage on the backend server 430, and/or the image data 460 may be transmitted to the client device 404, 406 for storage on the client devices 404, 406. As a result, the user/owner may be able to access the image data 460 recorded during the time that the light source 445 is turned on, which may be beneficial when the user/owner of the client device 404 turned on the light source 445 in response to a suspicion of suspicious activity in the field of view of the A/V recording and communication device 402.

The device setup tone 488 may be a certain sound or combination of sounds that, when recorded by the microphone 446 of the A/V recording and communication device 402 (e.g., as the audio data 486), and analyzed by the processor 452, may activate the device setup mode of the A/V recording and communication device 402. As a result, the A/V recording and communication device 402 may be configured to receive the second configuration settings 484 (e.g., updates to the first configuration settings 482) without requiring any manual manipulation of the device 402 (e.g., pressing a setup button on the device 402, turning on/off the power source to the device 402, etc.). As described herein, this may prove especially useful when the A/V recording and communication device 402 is installed in a hard-to-reach location (e.g., over a garage door, along the roofline of a house, etc.). In some of the present embodiments, the device setup tone 488 may be a default tone stored on the client application 540, such that when the user/owner of the client device 404 provides an input for activating the device setup mode of the A/V recording and communication device 402, the speaker 528 of the client device 404 will play the device setup tone 488. In addition, the A/V recording and communication device 402 may recognize the device setup tone 488 based on the default settings of the device 402.

The light source 445 may include floodlights (similar to the floodlights 306 of FIG. 4), spotlights, or another light source. The light source may be integral to the A/V recording and communication device 402 (similar to the floodlights 306 of FIG. 4), or may be a separate component that is in communication and/or connection to the A/V recording and communication device 402.

Figure 8:
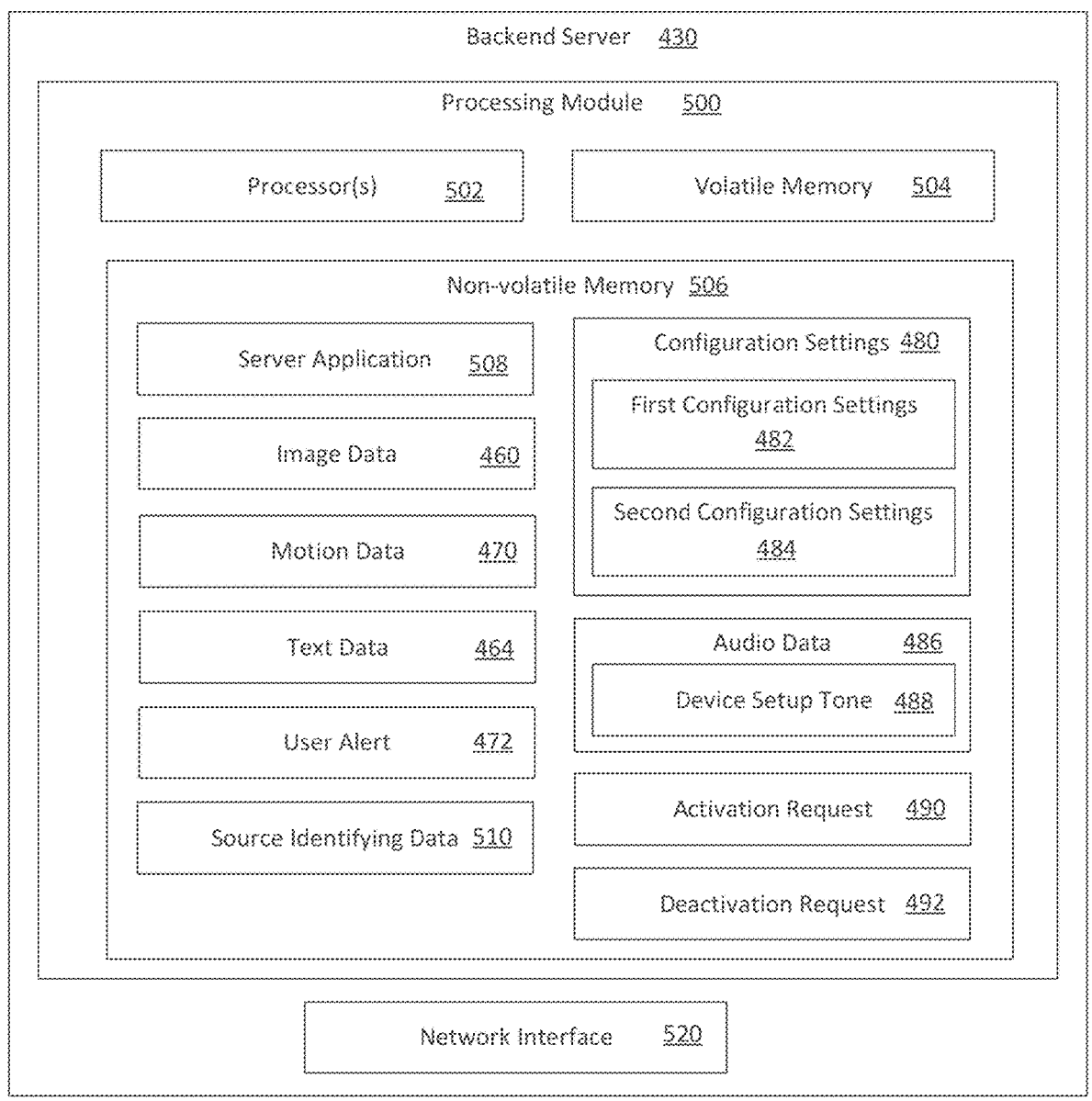
FIG. 8 is a functional block diagram illustrating one embodiment of a backend device according to various aspects of the present disclosure.

FIG. 8 is a functional block diagram illustrating one embodiment of the backend server(s) 430 according to various aspects of the present disclosure. The backend server(s) 430 may comprise a processing module 500 including a processor 502, volatile memory 504, a network interface 520, and non-volatile memory 506. The network interface 520 may allow the backend server(s) 430 to access and communicate with devices (e.g., the A/V recording and communication device 402 and/or the client devices 404, 406) connected to the network (Internet/PSTN) 410. The non-volatile memory 506 may include a server application 508 that configures the processor 502 to receive the image data 460, the audio data 462, the text data 464, the motion data 470, the configuration settings 480, the activation request 490, the deactivation request 492, and/or the user alert 472 from the A/V recording and communication device 402 (e.g., in the output signal 466) and/or the client device 404 (e.g., in the output signal 467). In addition, the server application 508 may configure the processor 502 to transmit the image data 460, the audio data 462, the text data 464, the motion data 470, the configuration settings 480, the activation request 490, the deactivation request 492, and/or the user alert 472 to the A/V recording and communication device 402 and/or the client device 404. In some of the present embodiments, the backend server 430 may perform some of the processing of the A/V recording and communication device 402 and/or the client device 404. For example, the backend server 430 may receive a request to update the configuration settings 480 of the A/V recording and communication device 402 from the client device 404, and in response, may generate the second configuration settings 484 and transmit the second configuration settings 484 to the A/V recording and communication device 402.

In further reference to FIG. 8, the non-volatile memory 506 may also include source identifying data 510 that may be used to identify the A/V recording and communication device 402 and/or the client devices 404, 406. In addition, the source identifying data 510 may be used to determine which client device 404, 406 are associated with each A/V recording and communication device 402.

Figure 9:
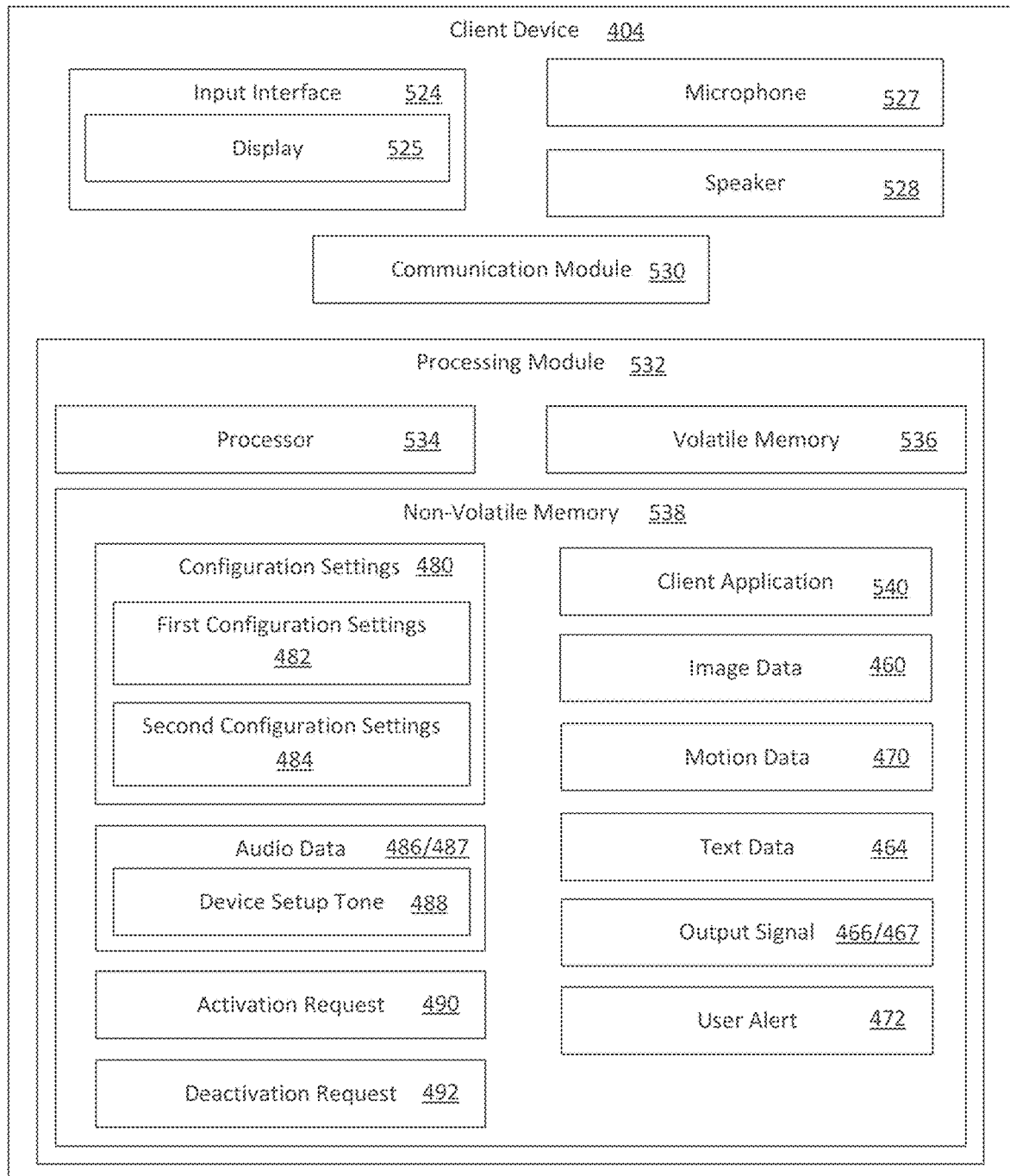
FIG. 9 is a functional block diagram illustrating one embodiment of a client device according to various aspects of the present disclosure.

Now referring to FIG. 9, FIG. 9 is a functional block diagram illustrating one embodiment of a client device 404 according to various aspects of the present disclosure. The client device 404 may comprise a processing module 532 that is operatively connected to an input interface 524, a microphone 527, a speaker 528, and a communication module 530. The processing module 532 may comprise a processor 534, volatile memory 536, and non-volatile memory 538 that includes a client application 540. In various embodiments, the client application 540 may configure the processor 534 to receive input(s) to the input interface 524 (e.g., requests to generate and broadcast the device setup tone 488) and, in response, broadcast (e.g., play through the speaker 528) the device setup tone 488. The client application 540, in some of the present embodiments, may configure the processor 534 to analyze requests for updating the configuration settings 480 and to generate updated configuration settings (e.g., the second configuration settings 484) in response. In addition, the client application 540 may configure the processor 534 to capture the audio data 487 using the microphone 527, and/or generate the device setup tone 488 using the speaker 528. In addition, the client application 540 may configure the processor 534 to transmit the audio data 487, the activation request 490, the deactivation request 492, and/or the configuration settings 480 to the A/V recording and communication device 402 and/or the backend server(s) 430 using the communication module 530.

Figure 16:
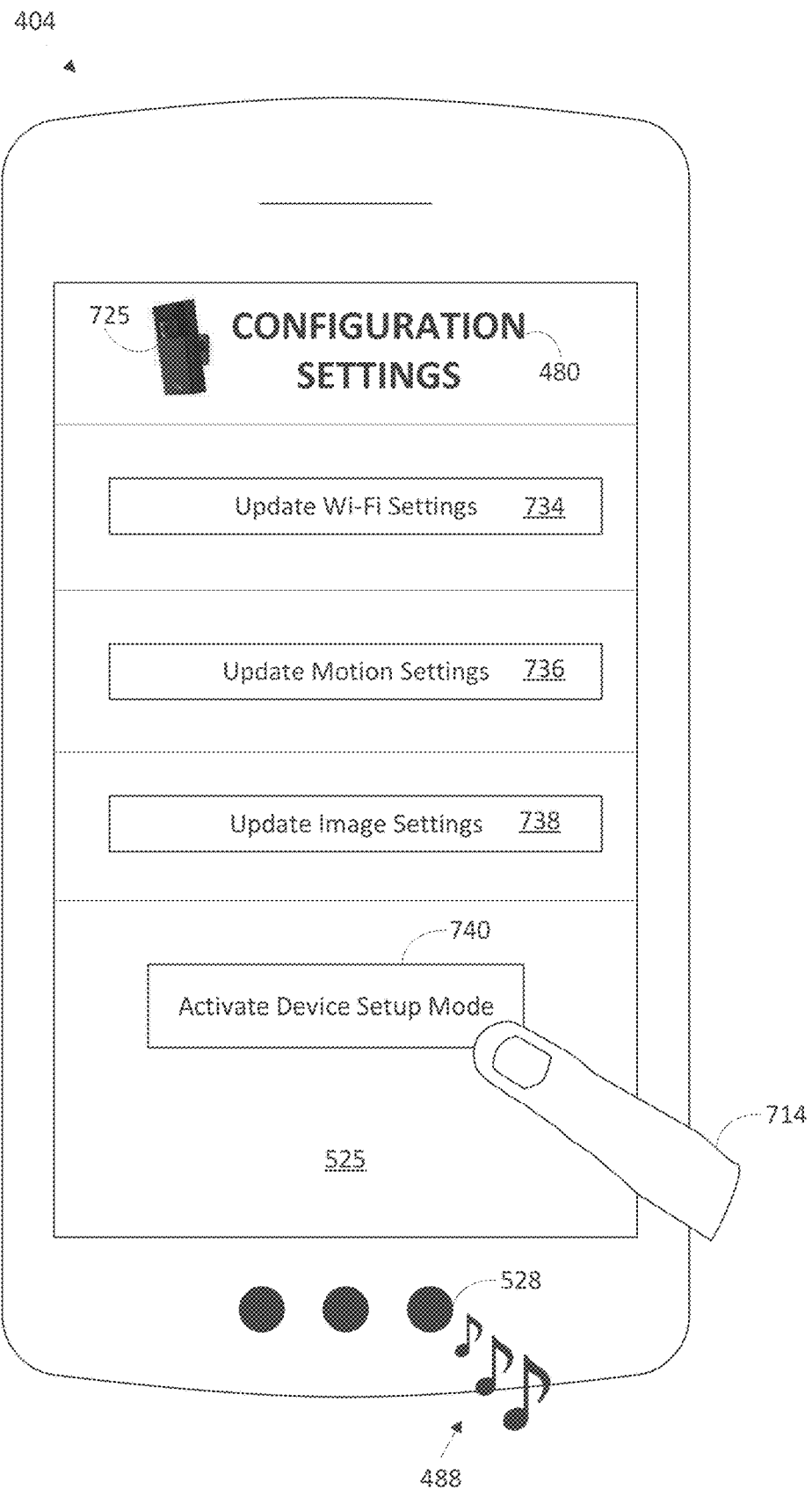
FIGS. 16-17 are screenshots of a graphical user interface (GUI) illustrating aspects of a process for setup and configuration of A/V recording and communication devices according to various aspects of the present disclosure.
Figure 17:
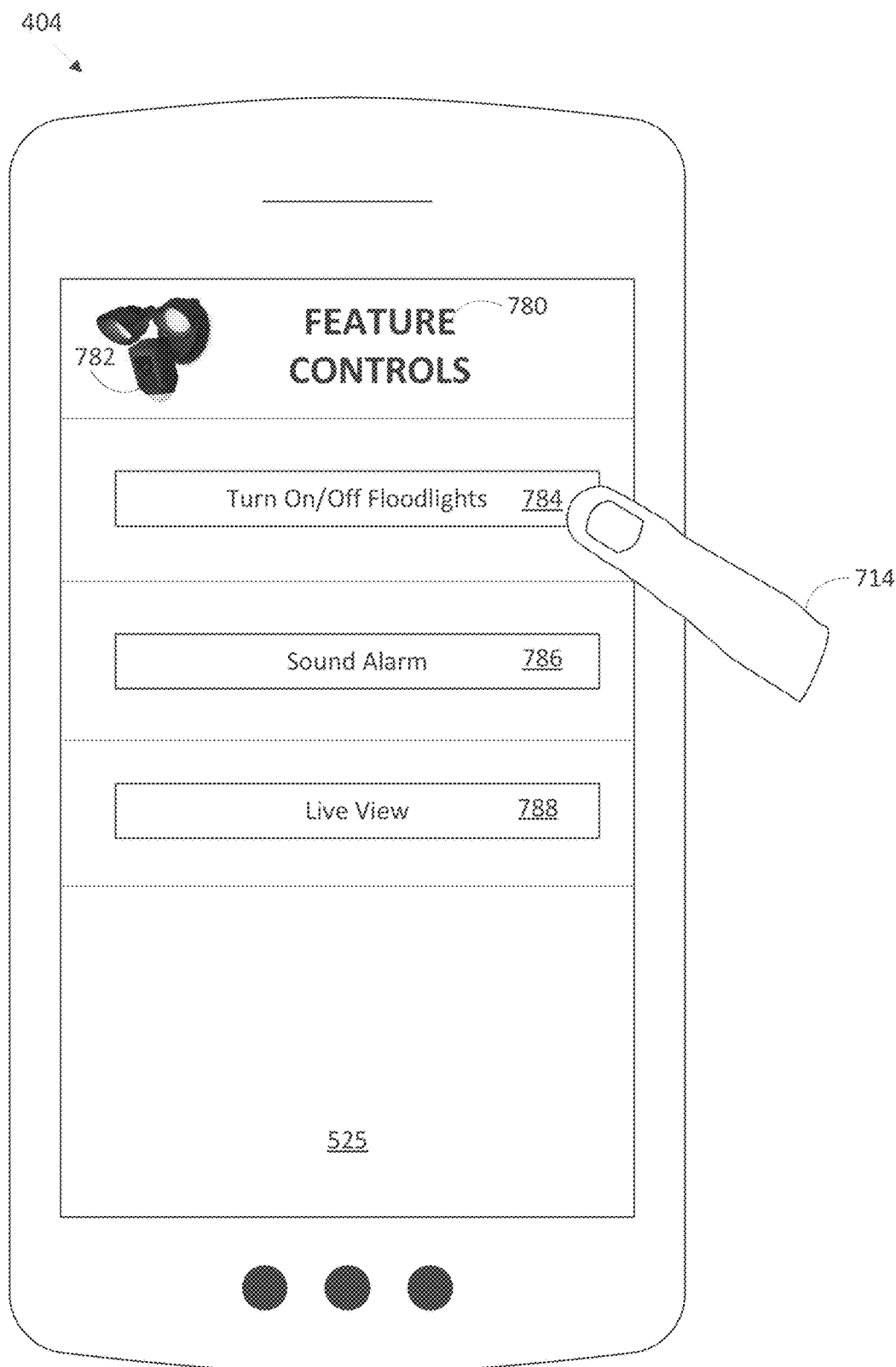

With further reference to FIG. 9, the input interface 524 may include a display 525. The display 525 may include a touchscreen, such that the user of the client device 404 can provide inputs directly to the display 525 (as illustrated in FIGS. 16 and 17). In some embodiments, the client device 404 may not include a touchscreen. In such embodiments, the user may provide an input using any input device, rather than a finger. Non-limiting examples of input devices include a mouse, a trackball, a touchpad, a joystick, a pointing stick, a stylus, etc.

In the illustrated embodiments of FIGS. 7-9, the various components including (but not limited to) the processing modules 446, 500, 532, the communication module 450, 530, and the network interface 520 are represented by separate boxes. The graphical representations depicted in each of FIGS. 7-9 are, however, merely examples, and are not intended to indicate that any of the various components of the A/V recording and communication device 402, the backend server(s) 430, or the client device 404 are necessarily physically separate from one another, although in some embodiments they might be. In other embodiments, however, the structure and/or functionality of any or all of the components of the A/V recording and communication device 402 may be combined. In addition, in some embodiments the communication module 450 may include its own processor, volatile memory, and/or non-volatile memory. Additionally, the structure and/or functionality of any or all of the components of the client device 404 may be combined. In some embodiments, the communication module 532 may include its own processor, volatile memory, and/or non-volatile memory. Further, the structure and/or functionality of any or all of the components of the backend server(s) 430 may be combined. In addition, in some embodiments the network interface 520 may include its own processor, volatile memory, and/or non-volatile memory.

Now referring to FIG. 10, FIG. 10 is a flowchart illustrating a process for setup and configuration of audio/video (A/V) recording and communication devices according to various aspects of the present disclosure. The process 1000, at block B600, activates, by a processor, a microphone to record audio data. For example, the processor 452 of the A/V recording and communication device 402 may activate the microphone 446 to record the audio data 486. In some of the present embodiments, the microphone 446 may be activated in response to the motion sensor 472 and/or the camera 444 detecting motion in a field of view of the motion sensor 472 and/or the camera 444, respectively. For example, in response to detecting the presence of a person, the microphone 446 may be activated. In addition, in such an example, in response to detecting motion, the camera 444 may also be activated to record the image data 460 in the field of view of the camera 444. The processor 452 may also generate and transmit, using the communication module 450, the user alert 472 to the backend server 430 and/or the client device 404, 406 in response to detecting the motion, where the user alert 472 may include the image data 460 and/or the audio data 486.

In some of the present embodiments, the user of the client device 404 may activate the microphone 446 by entering a live view mode of the A/V recording and communication device 402 via the client device 404. For example, the user may be able to enter the live view mode through the client application 540, where the live view mode activates the camera 444 and the microphone 446 of the A/V recording and communication device 402 and enables the user to view the image data 460 being recorded in the field of view of the camera 444 and listen to the audio data 486 being recorded by the microphone 446. Once in the live view mode, because the microphone 446 is activated, the client device 404 may broadcast the device setup tone 488 for activating the device setup mode of the A/V recording and communication device 402. In other embodiments, the user may activate only the microphone 446 from the client device 404, and once activated, may provide an input to the client device 404 instructing the client device 404 to generate the device setup tone 488.

For example, the user of the client device 404, where the client device 404 is associated with the A/V recording and communication device (e.g., where the client device 404, 406 receives the user alerts 472 generated by the A/V recording and communication device 402), may desire to put the A/V recording and communication device 402 into the device setup mode. As a result, the user may enter the field of view of the motion sensor 472 and/or the camera 444 of the A/V recording and communication device 402 and, once in the field of view of the motion sensor 472 and/or the camera 444, the user may receive, on the display 525 of the client device 404, the user alert 472 (e.g., in the form of a notification, as live-streaming audio/video, etc.). Receiving the user alert 472 may provide the user an indication that the microphone 446 is activated, and as a result, the user may initiate the broadcast of the device setup tone 488 through the speaker 528 of the client device 404. In some of the present embodiment, in addition to, or in lieu of the user alert 472, the user of the client device 404 may receive a different type of notification that the microphone 446 is activated, indicating to the user that the microphone 446 is capable of hearing the device setup tone 488 (e.g., a "microphone active" notification on the client device 404, a visual and/or audible indicator on the A/V recording and communication device 402 indicative of the microphone 446 being activate, etc.).

In some of the present embodiments, in response to recording the audio data 486, the audio data 486 may be converted from an analog audio format (e.g., sound waves) to a digital audio format (e.g., string of numbers) (e.g., using an analog-to-digital (A/D) converter of the A/V recording and communication device 402). Once in the digital audio format, the audio data 486 may be converted into an audio fingerprint (sometimes referred to as an acoustic fingerprint), and the audio fingerprint may be used for determining whether the audio data 486 includes the device setup tone. The audio fingerprint may be, for example, a digital summary of one or more attributes (e.g., frequencies, bandwidths, etc.) of the audio data 486. The audio fingerprint may be generated using any known technique, including those described herein. Once the audio fingerprint has been generated, the audio fingerprint may be compared against a database of audio fingerprints to determine if the audio data 486 includes at least one audio fingerprint included in the database of audio fingerprints (e.g., if the audio data 486 includes the audio fingerprint for the device setup tone 488) (at block B602).

For example, in some embodiments, the digital audio format may be converted into a spectrogram (e.g., a graph showing how the frequencies of the sound change in intensity over time). This may be done, for example, using the Fourier Transform, such as the Discrete Fourier Transform (DFT), the Fast Fourier Transform (FFT), or the Short-Time Fourier Transform, a Laplace Transform, a Gabor Expansion, and/or another process. The spectrogram may then be filtered by, for example, using a low-pass filter, a high-pass filter, or a band pass filter. After filtering, additional processing may be completed, such as by creating a correlation between peak frequencies over time (e.g., drawing a line between each recorded peak frequency). The end result may be the audio fingerprint for the audio data 486.

The process 1000, at block B602, analyzes, by the processor, the audio data. For example, the processor 452 of the A/V recording and communication device 402 (and/or the processor 502 of the backend server 430, in embodiments where the audio data 486 is transmitted to the backend server 430) may analyze the audio data 486. The analysis of the audio data 486 may include determining if the audio data 486 includes the device setup tone 488 (in addition to, in some embodiments, an analysis of the audio data 486 for speech recognition, voice recognition, etc.). In some of the present embodiments, the analysis of the audio data 486 may include comparing the audio fingerprint(s) from the audio data 486 to the audio fingerprint for the device setup tone 488 (which may be included in the database of audio fingerprints stored on the A/V recording and communication device 402 and/or the backend server 430, depending on the embodiment).

The process 1000, at block B604, determines, by the processor based on the analysis of the audio data, that the audio data includes a device setup tone. For example, the processor 452 of the A/V recording and communication device 402 (and/or the processor 502 of the backend server 430) may determine, based on the analysis (at block B602), that the audio data 486 includes the device setup tone 488. In any embodiment, one or more different processes for sound/tone recognition, including audio fingerprinting, neural networks, and/or other processes, may be used for determining that the audio data 486 includes the device setup tone 488. In some of the present embodiments, determining that the audio data 486 includes the device setup tone 488 may include determining that the audio fingerprint of the audio data 486 matches the audio fingerprint of the device setup tone 488, as described above.

In some of the present embodiments, the device setup tone 488 may be broadcast in frequency range and for a duration that is distinct from the frequency ranges and durations of common sounds (e.g., voices, moving cars, bikes, skateboards, people, and other objects, cars honking, sirens and alarms, doors opening and closing, music, animals, ring/doorbell tones, sounds of nature, lawnmowers and other power equipment, etc.) heard by the A/V recording and communication device 402. As such, when the processor analyzes the audio data 486 that includes the device setup tone 488, the device setup tone 488 may be identifiable based on its unique frequency and/or duration. In such embodiments, the processor 452 may analyze the audio data 462 to determine if the frequency of the device setup tone 488 is present, and if so, may additionally analyze the audio data 486 to determine the duration that the frequency is present. If the audio data 486 includes the frequency and/or duration of the device setup tone 488, the determination may be that the audio data 486 includes the device setup tone 488, and the device setup mode may be activated.

The process 1000, at block B606, activates, by the processor, a device setup mode of the A/V recording and communication device. For example, the processor 452 of the A/V recording and communication device 402 may activate the device setup mode. The device setup mode may configure the A/V recording and communication device 402 to receive updates to the configuration settings 480. In some of the present embodiments, when the A/V recording and communication device 402 activates the device setup mode, the camera 444, the microphone 446, the speaker 448, and/or other components of the device 402 may be deactivated.

In some of the present embodiments, prior to activating the device setup mode, and after determining that the audio data 462 includes the device setup tone 488, the camera 444 may capture the image data 460 in a field of view of the camera 444 and the image data 460 may be analyzed to determine if a person is present, and if so, whether the person is an authorized person. For example, because the user of the client device 404 may be standing in proximity to the A/V recording and communication device 402 when the client device 404 broadcasts the device setup tone 488, the person in the field of view of the camera 444 may be the user. As a result, the image data 460 may be analyzed (e.g., locally by the A/V recording and communication device and/or remotely by the backend server 430) to determine if the person (e.g., the user) is an authorized person (e.g., authorized to make updates to the configuration settings 480, including in the authorized persons associated with the A/V recording and communication device 402, etc.). The analysis of the image data may be performed using computer vision and/or other technologies, including those described above. For example, facial recognition may be used to determine the facial characteristics of the person in the image data 460, and the results of the facial recognition analysis may be compared against a database of authorized persons to determine if the person is an authorized person. By including the additional process of determining if the person is an authorized person, unwanted reconfiguration and/or disablement of the A/V recording and communication device 402 may be avoided (e.g., a person using a client device 404 not associated with the A/V recording and communication device 402 broadcasting the device setup tone 488 may not be capable of activating the device setup mode). In any embodiment, once the person is determined to be an authorized person, the device setup mode may be activated by the A/V recording and communication device 402. If the person is determined not to be an authorized person, the processor 452 may generate and/or update the user alert 472 to include an indication that an unauthorized person is attempting to activate the device setup mode of the A/V recording and communication device 402.

In some of the present embodiments, the above described concern of avoiding unwanted reconfiguration and/or disablement of the A/V recording and communication device 402 may be resolved by generating unique device setup tones 488 for each A/V recording and communication device and/or for each of the A/V recording and communication devices 402 associated with a single user/owner/account. In such embodiments, the user/owner may be able to create their own device setup tone 488, similar to a ringtone of a client device, for example.

Now referring to FIG. 11, FIG. 11 is a flowchart illustrating a process for setup and configuration of audio/video (A/V) recording and communication devices according to various aspects of the present disclosure. The process 1100, at block B608, detects, by at least one of a camera and a motion sensor, motion in a field of view of an A/V recording and communication device. For example, the motion sensor 474 may detect motion in a field of view of the motion sensor 474 and/or the camera 444 may detect motion in a field of view of the camera 444.

The process 1100, at block B610, may proceed to block B600 of the process 1000 of FIG. 10. For example, after detecting motion (at block B608), the A/V recording and communication device 402 may be activated to record the image data 460 using the camera 444 and to record the audio data 486 using the microphone 486. The process 1100, at block B612, may continue from block B606 of the process 1000 of FIG. 10.

The process 1100, at block B614, receives, by a processor, using a communication module, from a client device, updated configuration settings. For example, the processor 452 of the A/V recording and communication device 402 may receive, using the communication module 450, from the client device 404, updates to the configuration settings 480. As described below, the user of the client device 404 may input the updates to the configuration settings 480 using the client device 404, and the client device 404 may transmit the updates to the configuration settings 480 to the A/V recording and communication device 402 (in some embodiments, via the backend server 430).

The process 1100, at block B616, updates, by the processor based on the updated configuration settings, first configuration settings of the A/V recording and communication device to second configuration settings. For example, the processor 452 of the A/V recording and communication device 402 may use the updates to the configuration settings 480 to update the first configuration settings 482 of the A/V recording and communication device to the second configuration settings 484. In some of the present embodiments, the backend server 430 and/or the client device 404 may use the first configuration settings 482 to generate the second configuration settings 484 based on the updates to the configuration settings 480 provided by the user, and may transmit the second configuration settings 484 to the A/V recording and communication device 402.

The process 1100, at block B618, deactivates, by the processor, a device setup mode of the A/V recording and communication device. For example, the processor 452 of the A/V recording and communication device 402 may deactivate the device setup mode. The device setup mode may be deactivated in response to receiving a command from the client device 404, or in response to updating the configuration settings 480, or after a predetermined amount of time without receiving any updates to the configuration settings 480, etc.

The process 1100 of FIG. 11 may be implemented in a variety of embodiments, including those discussed below. However, the below-detailed embodiments are not intended to be limiting, and are provided merely as example embodiments of the present disclosure. Other embodiments similar to those outlined herein may also fall within the scope of the present disclosure.

In one example, a user of the client device 404 may approach the A/V recording and communication device 402, and the motion sensor 474 and/or the camera 444 may detect the motion of the user and generate the motion data 470 (at block B608). The motion data 470 may be analyzed to determine that the camera 444 and/or the microphone 446 should be activated. In response, the microphone 446 of the A/V recording and communication device 402 may be activated to record the audio data 486 (in some embodiments, the camera 444 may also be activated to record the image data 460) (at block B600). The user may receive a notification that the microphone 446 is activated (e.g., by receiving the user alert 472 via the client device 404). Once the user is aware that the microphone 446 is activated, the user may trigger the client device 404 to broadcast the device setup tone 488 (e.g., using the client application 540, as illustrated in FIG. 16). As a result, the audio data 486 may be recorded by the microphone 486 during the time that the client device 404 is broadcasting the device setup tone 488. The audio data 486 may then be analyzed (at block B602) and, based on the analysis, it may be determined that the audio data 486 includes the device setup tone 488 (at block B604). In some of the present embodiments, the audio data 486 may be analyzed to determine the peak frequencies (e.g., the frequencies over a threshold amount, such as 750 Hz), and a line may be drawn between the peak frequencies to create the audio fingerprint of the audio data 486. In such an example, at three seconds the peak frequency may be 850 Hz, at five seconds (two seconds later) the peak frequency may be 780 Hz, and at six seconds (one second later) the peak frequency may be 920 Hz. A line may then be drawn between the 850 Hz, the 780 Hz, and the 920 Hz frequencies, where the line represents the peak frequencies over time, and the line may represent the audio fingerprint for the audio data 486. This audio fingerprint may then be compared to the audio fingerprint for the device setup tone 488, which may include the peak frequency of 850 Hz, two seconds later a peak frequency of 780 Hz, and a second later a peak frequency of 920 Hz. As a result, a match may be determined between the audio fingerprint for the audio data 486 and the audio fingerprint for the device setup tone 488. Once the match is determined (at block B604), the A/V recording and communication device 402 may activate the device setup mode (at block B606). The user may input desired updates to the configuration settings 480 of the A/V recording and communication device 402 using the client device 404, and once in the device setup mode, the A/V recording and communication device 402 may receive the updates to the configuration settings 480 (at block B614). Based on the updates to the configuration settings 480, the A/V recording and communication device 402 may update the first configuration settings 482 to the second configuration settings 484 (at block B618). Once the configuration settings 480 are updated, the device setup mode may be deactivated (at block B618).

The processes 1000 and 1100 enable the user/owner of the A/V recording and communication device 402 to update the configuration settings 480 without having to manually interact with the device 402. For example, traditionally, for A/V recording and communication devices mounted out of reach, the user/owner may have to use a ladder or other stepping apparatus to access the device, physically remove the device from its mounting position, and activate the device setup mode (e.g., by pressing a setup button located on the A/V recording and communication device 402). However, by implementing the processes 1000 and 1100, the user/owner may be capable of activating the device setup mode without having to manually interact with the A/V recording and communication device 402, thereby saving time and energy, preventing potential damage to the house and/or injury to the user/owner, and also increasing the likelihood that the user/owner reconfigures their A/V recording and communication device 402 at an earlier time (e.g., because of the simplicity of reconfiguration), thereby providing the safety and security of the A/V recording and communication device 402 at an earlier time.

Now referring to FIG. 12, FIG. 12 is a flowchart illustrating a process for setup and configuration of audio/video (A/V) recording and communication devices according to various aspects of the present disclosure. The process 1200, at block B620, generates, by a processor, and broadcasts, by a speaker, a device setup tone. For example, the processor 534 of the client device 404 generates, and the speaker 528 broadcasts, the device setup tone 488. The device setup tone 488 may be a song (or portion thereof), a sequence of sounds, a single sound, a voice command, or another audible tone. For example, with reference to FIG. 16, in response to a user input (e.g., an input to the display 525 by the user using his or her finger 714) to select the device setup mode activation button 740 for activating the device setup mode, the speaker 528 of the client device 404 may broadcast the device setup tone 488.

The process 1200, at block B622, receives, by the processor, an input including updated configuration settings for an A/V recording and communication device. For example, the processor 534 of the client device 404 may receive an input including updates to the configuration settings 480 for the A/V recording and communication device 402. For example, with reference to FIG. 16, the user of the client device 404 may provide inputs to update the network connectivity settings 734, the motion detection settings 736, the image data 460 quality settings 738, the notification settings, and/or other configuration settings 480 of the A/V recording and communication device 402.

The process 1200, at block B624, transmits, by the processor using a communication module, the updated configuration settings for updating first configuration settings of the A/V recording and communication device to second configuration settings. For example, the processor 534 of the client device 404, using the communication module 530, may transmit the updates to the configuration settings 480 to the A/V recording and communication device 402 (in some embodiments, via the backend server 430). The updates to the configuration settings 480 may be configured to update the first configuration settings 482 to the second configuration settings 484. In some of the present embodiments, as described above, the client device 404 and/or the backend server 430 may update the configuration settings 480 from the first configuration settings 482 to the second configuration settings 484 prior to transmitting the updates, and my transmit the second configuration settings 484 to the A/V recording and communication device 402.

Now referring to FIG. 13, FIG. 13 is a flowchart illustrating a process for setup and configuration of audio/video (A/V) recording and communication devices according to various aspects of the present disclosure. The process 1300, at block B626, activates, by a processor, a device configuration mode. For example, the processor 534 of the client device 404 may activate a device configuration mode. The device configuration mode may be accessed using the client application 540, and the device configuration mode may be configured to enable the user to activate the device setup mode and provide updates to the configuration settings 480 of the A/V recording and communication device 402. The screenshot of the GUI of FIG. 16 may be an example illustration of the client device 404 in the device configuration mode.

The process 1300, at block B628, receives, by the processor, a device setup tone request. For example, the processor 524 of the client device 404 may receive a request for broadcasting the device setup tone 488. With reference to FIG. 16, in one example, the user may select the device setup mode activation button 740.

The process 1300, at block B630, may proceed to block B620 of the process 1200 of FIG. 12. The process 1300, at block B632, may continue from block B624 of FIG. 12.

The process 1300, at block B634, deactivates, by the processor, a device configuration mode. For example, the processor 534 of the client device 404 may deactivate the device configuration mode. In some of the present embodiments, deactivating the device configuration mode on the client device 404 may also include transmitting a request to the A/V recording and communication device 402 to deactivate the device setup mode.

Figures 14, 15:
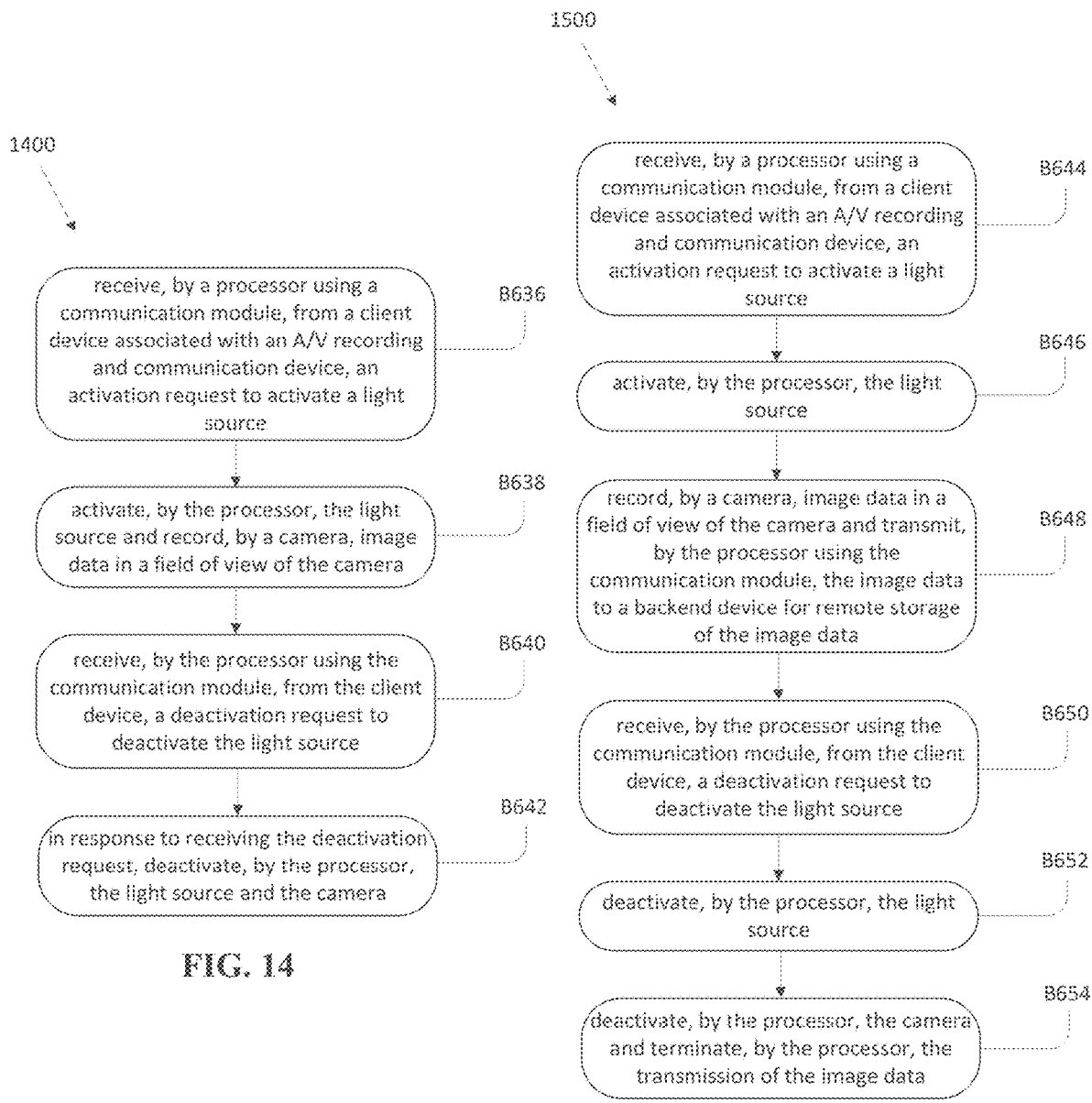
FIGS. 14-15 are flowcharts illustrating processes recording during light source activation for A/V recording and communication devices according to various aspects of the present disclosure.

FIG. 14 is a flowchart illustrating a process of recording during light source activation for A/V recording and communication devices according to various aspects of the present disclosure. The process 1400, at block B636, receives, by a processor using a communication module, from a client device associated with an A/V recording and communication device, an activation request to activate a light source. For example, the processor 452 of the A/V recording and communication device 402 (in some embodiments, via the backend server 430), using the communication module 450, may receive, from the client device 404, the activation request 490 for activating the light source 445. For example, as illustrated in FIG. 17, the user of the client device 404 may select (with his or her finger 714) the light activation button 784 on the display 525 of the client device 404 in a feature control window 780 of the GUI. In response, the client device 404 may generate and transmit the activation request 490 to the A/V recording and communication device 402 for turning on the light source 445. From the feature control window 780, the user may also be capable of activating an alarm by selecting the alarm activation button 786 and/or entering a live view mode of the A/V recording and communication device 402 by selecting the live view activation button 788.

The process 1400, at block B638, activates, by the processor, the light source and records, by a camera, image data in a field of view of the camera. For example, the processor 452 of the A/V recording and communication device 402, in response to receiving the activation request 490, may activate (e.g., turn on) the light source 445 and activate the camera 444 to record the image data 460 in a field of view of the camera 444. The camera 444 may be activated in response to the activation request 490 for activating the light source 445 being received by the A/V recording and communication device 402. In addition, in some of the present embodiments, the camera 444 may continue recording until the light source 445 is deactivated (e.g., automatically deactivated after a predetermined period of time, deactivated in response to the deactivation request 492 being received, etc.) and/or after a predetermined period of time expires. The image data 460 recorded by the camera 444 may be stored locally on the A/V recording and communication device 402, may be transmitted to the backend server 430 and stored on the backend server, and/or may be transmitted to the client device 404 and stored on the client device 404. In some of the present embodiments, because the user of the client device 404 may only intend to activate the light source 445 and not to view the image data 460, the image data 460 may be recorded and stored in the background (e.g., such that the image data 460 is not displayed on the client device 404 automatically). As a result, the user may be able to access the image data 460 at a later time to determine if there was any suspicious activity taking place during the time that the light source 445 was activated. If, however, the camera 444 was not activated to record the image data 460 in response to the activation request 490 for turning on the light source 445, as described in the processes 1400, the user may not have a visual record of the potentially suspicious activity that may have prompted the user to turn on the light source 445.

The process 1400, at block B640, receives, by the processor using the communication module, from the client device, a deactivation request to deactivate the light source. For example, the processor 452 of the A/V recording and communication device, using the communication module 450, may receive, from the client device 404 (in some embodiments, via the backend server 430), a deactivation request 492 for deactivating the light source 445. For example, as illustrated in FIG. 17, the user may select the light source activation button 784 using his or her finger 714 to turn off the light source 445 (e.g., by generating and transmitting the deactivation request 492 to the A/V recording and communication device 402). In some of the present embodiments, the light source 445 may be deactivated without receiving the deactivation request 492. For example, the light source 445 may automatically deactivate (e.g., turn off) after a predetermined period of time (e.g., without limitation, five minutes, ten minutes, thirty minutes, one hour, two hours, etc.). In another example, the light source 445 may automatically deactivate at a particular time of day (e.g., without limitation, at 6:00 a.m., at 6:30 a.m., at sunrise (as determined using the camera 444 and/or another light sensor, and/or based on sunrise data retrieved from the backend server 430 and/or from a weather application on the Internet), etc.).

The process 1400, at block B642, in response to receiving the deactivation request, deactivates, by the processor, the light source and the camera. For example, the processor 452 of the A/V recording and communication device 402 may deactivate the camera 444 and the light source 445 in response to receiving the deactivation request 492. In such an example, the deactivation request 492 may be configured to deactivate both the light source 445 and the camera 444. In any embodiment, once the light source 445 is deactivated (e.g., in response to the deactivation request 492, in response to the predetermined amount of time expiring, at a particular time of day, etc.), the camera 444 may also be deactivated (e.g., the camera 444 may stop recording the image data 460 and/or the image data 460 may stop being transmitted to the backend server 430 and/or the client device 404).

FIG. 15 is a flowchart illustrating a process of recording during light source activation for A/V recording and communication devices according to various aspects of the present disclosure. The process 1500, at block B644, receives, by a processor using a communication module, from a client device associated with an A/V recording and communication device, an activation request to activate a light source. For example, the processor 452 of the A/V recording and communication device 402, using the communication module 450, may receive, from the client device 404 (in some embodiments, via a backend device), the activation request 490 for activating the light source 445. This process may be similar to that of block B636 of the process 1400 of FIG. 14, described above.

The process 1500, at block B646, activates, by the processor, the light source. For example, in response to receiving the activation request 490, the processor 452 of the A/V recording and communication device 402 may activate (e.g., turn on) the light source 445.

The process 1500, at block B648, records, by a camera, image data in a field of view of the camera and transmits, by the processor using the communication module, the image data to a backend device for remote storage of the image data. For example, in response to the light source 445 being activated, the camera 444 may begin recording the image data 444 in a field of the camera 444 and the processor 452, using the communication module 450, may begin transmitting the image data 460 to a backend device (e.g., the backend server 430) for remote storage of the image data 460 on the backend device. As a result, as described above, the user may be able to access the image data 460 using the client device 404 (e.g., by downloading/streaming the image data 460 from the backend device).

The process 1500, at block B650, receives, by the processor using the communication module, from the client device, a deactivation request to deactivate the light source. For example, the processor 452 of the A/V recording and communication device 402 may receive, using the communication module 450, the deactivation request 492 from the client device 404 (in some embodiments, via the backend device) for deactivating the light source 445.

The process 1500, at block B652, deactivates, by the processor, the light source. For example, in response to receiving the deactivation request 492, the processor 452 of the A/V recording and communication device 402 may deactivate the light source 445.

The process 1500, at block B654, deactivates, by the processor, the camera and terminates, by the processor, the transmission of the image data. For example, in response to the light source 445 being deactivated (and/or in response to receiving the deactivation request 492), the processor 452 of the A/V recording and communication device 402 may deactivate the camera 444 and terminate the transmission of the image data 460 to the backend device.

The processes 1400 and 1500 described above provide the user of the client device 404 (associated with the A/V recording and communication device 402) to access the image data 460 captured by the camera 444 during the time that the user activates the light source 445 without the user having to activate the camera 444 on their own. This functionality is especially beneficial when the user may have a suspicion that suspicious activity is taking place in the field of view of the A/V recording and communication device 402 (e.g., in response to hearing a sound, in response to seeing a moving object, etc.) and, in response, the user activates the light source 445 to get a better view of the area illuminated by the light source 445. In such an example, the user may not desire to immediately activate the camera 444 and/or to view the image data 460, but may desire only to activate the light source 445. However, by activating the camera 444 to record the image data 460 and storing the image data 460 in the background (e.g., without displaying the image data 460 on the client device 404 and/or without automatically transmitting the image data 460 to the client device 404, such as in a user alert 472), the user may be able to access the image data 460 at a later time upon discovering that suspicious activity has taken place in the field of view of the A/V recording and communication device 402 during the time that the light source 445 is activated. As a result, the user may take appropriate actions (e.g., alerting law enforcement, arming a security system at property where the A/V recording and communication device 402 is located, alerting neighbors, locking the doors, etc.), therefore increasing the safety and security of the property, the surrounding properties, and the public safety as a whole.

Figure 18:
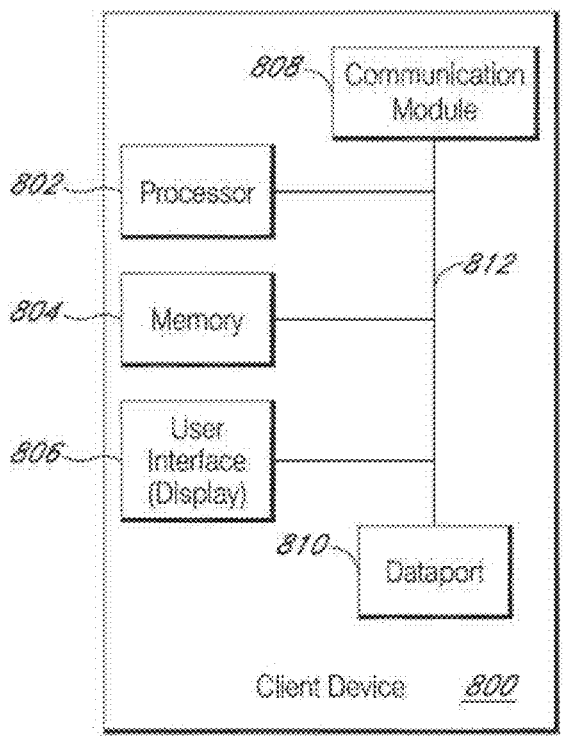
FIG. 18 is a functional block diagram of a client device on which the present embodiments may be implemented according to various aspects of the present disclosure.

FIG. 18 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 18, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random-access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 19:
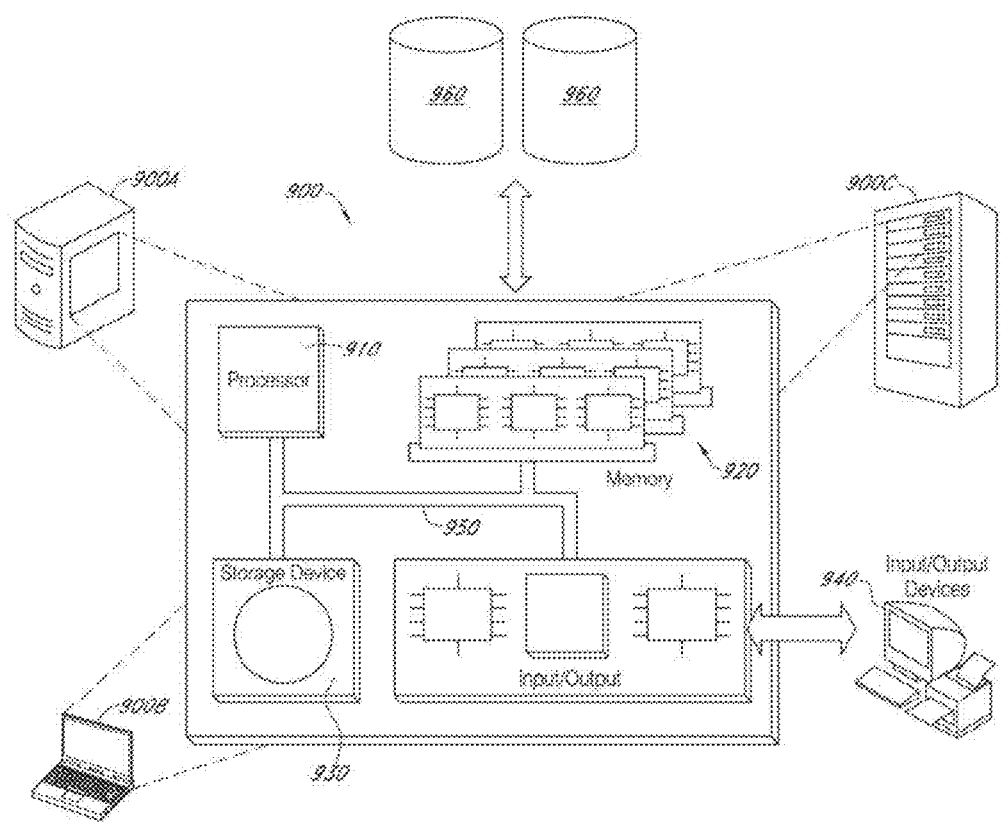
FIG. 19 is a functional block diagram of a general-purpose computing system on which the present embodiments may be implemented according to various aspects of present disclosure.

FIG. 19 is a functional block diagram of a general-purpose computing system on which the present embodiments may be implemented according to various aspects of present disclosure. The computer system 900 may execute at least some of the operations described above. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. An audio/video (A/V) recording and communication device comprising:
    a processor,
    a camera,
    a communication module,
    a light source, wherein the light source includes at least one of a floodlight or a spotlight, and
    a non-transitory machine-readable memory storing a program, the program executable by the processor, the program comprising sets of instructions for:
        receiving, using the communication module, via a server in communication with a client device associated with the A/V recording and communication device, an activation request to activate the light source;
        in response to receiving the activation request, activating the light source and recording, by the camera, image data representative of a field of view of the camera;
        receiving, using the communication module, via the server a deactivation request to deactivate the light source; and
        in response to receiving the deactivation request, deactivating the light source and the camera.

2. The A/V recording and communication device of claim 1, wherein the activation request originates from the client device.

3. The A/V recording and communication device of claim 1, wherein the server is at least one of a backend server or a storage device.

4. The A/V recording and communication device of claim 1, wherein the program further comprises sets of instructions for:
    in response to recording the image data, transmitting, using the communication module, the image data to the server for storage on the server.

5. The A/V recording and communication device of claim 4, wherein the image data is recorded by the camera and transmitted to the server until the deactivation request is received.

6. The A/V recording and communication device of claim 1, wherein the program further comprises sets of instructions for:

in response to recording the image data, storing the image data in a buffer on the non-transitory machine-readable memory of the A/V recording and communication device.

7. The A/V recording and communication device of claim 6, wherein the program further comprises sets of instructions for:
   receiving, using the communication module, from the client device, an image data request for the image data; and
   in response to receiving the image data request, accessing, from the non-transitory machine-readable memory, and transmitting, using the communication module, to the client device, the image data.

8. The A/V recording and communication device of claim 1, wherein the A/V recording and communication device is one of an A/V recording and communication floodlight or an A/V recording and communication spotlight.

9. The A/V recording and communication device of claim 1, wherein the program further comprises sets of instructions for:
   transmitting, using the communication module, the image data, wherein the image data includes live-streaming video.

10. An audio/video (A/V) recording and communication device comprising:
   one or more processors;
   a camera;
   a communication module;
   a light source, wherein the light source includes at least one of a floodlight or a spotlight; and
   a non-transitory machine-readable memory storing a program, the program executable by at least one of the processors, the program comprising sets of instructions for:
      receiving, using the communication module, from a client device associated with the A/V recording and communication device, an activation request to activate the light source;
      in response to receiving the activation request, activating the light source and recording, by the camera, image data representative of a field of view of the camera;
      transmitting, using the communication module, the image data to a server for remote storage of the image data;
      receiving, using the communication module, from the client device via the server, a deactivation request to deactivate the light source; and
      in response to receiving the deactivation request, deactivating the light source, deactivating the camera, and terminating the transmission of the image data.

11. The A/V recording and communication device of claim 10, wherein the activation request is received via the server.

12. The A/V recording and communication device of claim 10, wherein the server is at least one of a backend server or a storage device.

13. The A/V recording and communication device of claim 10, wherein the image data includes live-streaming video.

14. The A/V recording and communication device of claim 10, wherein the A/V recording and communication device is one of an A/V recording and communication floodlight or an A/V recording and communication spotlight.

15. A method for an audio/video (A/V) recording and communication device, the device including a processor, a camera, a communication module, and a light source, the method comprising:
   receiving, by the processor using the communication module, from a client device associated with the A/V recording and communication device, an activation request to activate the light source, wherein the light source includes at least one of a floodlight or a spotlight;
   in response to receiving the activation request, activating, by the processor, the light source and recording, by the camera, image data representative of a field of view of the camera;
   transmitting, by the processor using the communication module, the image data to a server for remote storage of the image data;
   receiving, by the processor using the communication module, from the client device via the server, a deactivation request to deactivate the light source;
   in response to receiving the deactivation request, deactivating, by the processor, the light source and the camera; and
   terminating, by the processor, the transmission of the image data.

16. The method of claim 15, wherein the activation request is received via the server.

17. The method of claim 15, wherein the server is at least one of a backend server or a storage device.

18. The method of claim 15, wherein the image data includes live-streaming video.

19. The method of claim 15, wherein the A/V recording and communication device is one of an A/V recording and communication floodlight or an A/V recording and communication spotlight.

* * * * *